(12) United States Patent
Ikegami

(10) Patent No.: US 10,048,502 B2
(45) Date of Patent: Aug. 14, 2018

(54) HEAD MOUNT DISPLAY

(71) Applicant: Seiko Epson Corporation, Tokyo (JP)

(72) Inventor: Tomio Ikegami, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/290,330

(22) Filed: Oct. 11, 2016

(65) Prior Publication Data

US 2017/0123214 A1    May 4, 2017

(30) Foreign Application Priority Data

Oct. 30, 2015   (JP) ................................. 2015-213919

(51) Int. Cl.
| | |
|---|---|
| G02B 27/01 | (2006.01) |
| G06F 3/0362 | (2013.01) |
| G06F 3/01 | (2006.01) |
| G06F 3/0484 | (2013.01) |

(52) U.S. Cl.
CPC ..... *G02B 27/0176* (2013.01); *G02B 27/0172* (2013.01); *G02B 27/0179* (2013.01); *G06F 3/011* (2013.01); *G06F 3/012* (2013.01); *G06F 3/0362* (2013.01); *G06F 3/04845* (2013.01); *G02B 2027/0138* (2013.01); *G02B 2027/0143* (2013.01); *G02B 2027/0154* (2013.01); *G02B 2027/0159* (2013.01); *G02B 2027/0178* (2013.01)

(58) Field of Classification Search
CPC .... G02B 2027/0138; G02B 2027/0143; G02B 2027/0154; G02B 2027/0159; G02B 2027/0178; G02B 27/0172; G02B 27/0176; G02B 27/0179; G06F 3/011; G06F 3/012; G06F 3/0362; G06F 3/04845
See application file for complete search history.

(56) References Cited

U.S. PATENT DOCUMENTS

| | | | | |
|---|---|---|---|---|
| 5,959,597 | A | * 9/1999 | Yamada | ............... G02B 27/017 345/7 |
| 2008/0309587 | A1 | * 12/2008 | Miyake | .............. G02B 27/0176 345/8 |
| 2009/0243970 | A1 | * 10/2009 | Kato | .................. G02B 27/0176 345/8 |
| 2011/0012814 | A1 | 1/2011 | Tanaka | |
| 2012/0306940 | A1 | * 12/2012 | Machida | ................ G02B 6/005 345/690 |

(Continued)

FOREIGN PATENT DOCUMENTS

| | | |
|---|---|---|
| JP | 09-318905 A | 12/1997 |
| JP | 2009-044387 A | 2/2009 |

(Continued)

*Primary Examiner* — Afroza Chowdhury
(74) *Attorney, Agent, or Firm* — Harness, Dickey & Pierce, P.L.C.

(57) ABSTRACT

A head mount display includes a frame attached to a head of an observer, an image display unit that displays an image to be visually recognized by the observer, a fixing part that fixes the image display unit to the frame, an detection part that detects a signal according to a relative attitude of the image display unit with respect to the frame, and a control part that controls the image displayed by the image display unit based on the output signal of the detection part.

10 Claims, 16 Drawing Sheets

(56) References Cited

U.S. PATENT DOCUMENTS

2015/0309317 A1* 10/2015 Osterhout .......... G02B 27/0176
359/630
2016/0062457 A1* 3/2016 Kobayashi ............. G06F 3/013
345/156
2016/0238236 A1* 8/2016 Im ...................... F21V 33/0052

FOREIGN PATENT DOCUMENTS

| JP | 2010-078726 A | 4/2010 |
| JP | 2011-023939 A | 2/2011 |
| JP | 2011-062970 A | 3/2011 |
| JP | 2011-066549 A | 3/2011 |
| JP | 2014-071277 A | 4/2014 |

* cited by examiner

HEAD MOUNT DISPLAY

BACKGROUND

1. Technical Field

The present invention relates to a head mount display.

2. Related Art

As head mount displays (HMDs) worn on heads of observers for use and displaying images to be visually recognized by the observers as virtual images, monocular head mount displays that display images only for one eye of observers is known (for example, see Patent Document 1 (JP-A-2011-66549)).

For example, a head mount display according to Patent Document 1 includes an image display unit for one eye that projects image light according to image information on one eye of an observer, and a spectacle-shaped frame that can supports the image display unit on either left or right side. Further, the head mount display includes a camera unit and the camera unit is rotatably supported by a front part of the spectacle-shaped frame switchably between a position along the left portion and a position along the right portion of the front part according to the position to which the image display unit is attached. Furthermore, the head mount display includes an acceleration sensor provided in the camera unit, determines on which side of the left or right side of the spectacle-shaped frame the image display unit is based on the detection result of the acceleration sensor, and rotates the image displayed by the image display unit based on the determination result.

In the head mount display according to Patent Document 1, in the case where the detection direction of the acceleration sensor is the horizontal direction (i.e., the direction perpendicular to the direction of gravitational acceleration), e.g. the case where the observer lies on his or her back, it is impossible to suitably determine the attachment position of the image display unit using the detection result of the acceleration sensor, and as a result, there is a problem of malfunction due to improper positioning of the top and bottom of the displayed image.

SUMMARY

An advantage of some aspects of the invention is to provide a monocular head mount display switchable between left and right sides that may perform suitable image display regardless of an attitude of an observer (user).

The advantage can be achieved by the invention with the following configuration.

A head mount display according to an aspect of the invention includes a frame attached to a head of an observer, an image display unit that displays an image to be visually recognized by the observer, a fixing part that fixes the image display unit to the frame, an detection part that detects a signal according to a relative attitude of the image display unit with respect to the frame, and a control part that controls the image displayed by the image display unit based on the output signal of the detection part.

According to the head mount display, the image display unit may display the image according to the relative attitude of the image display unit with respect to the frame. Accordingly, in the monocular head mount display switchable between left and right sides, suitable image display may be performed independent of the attitude of the observer (user).

In the head mount display according to the aspect of the invention, it is preferable that the fixing part can be switched between a first state in which the image display unit is fixed to the frame in a first attitude and a second state in which the image display unit is fixed to the frame in a second attitude different from the first attitude, and the control part rotates the image displayed by the image display unit in response to switching between the first state and the second state based on the output signal of the detection part.

According to this configuration, for example, in the case where the attitude of the image display unit with respect to the frame is changed and the state in which the image display unit performs image display for the left eye of the observer and the state in which the image display unit performs image display for the right eye of the observer are switched, when the state in which the image display unit performs image display for the left eye of the observer is the first state and the state in which the image display unit performs image display for the right eye of the observer is the second state, image display may be suitably performed without turning the image upside down for the observer in either state.

In the head mount display according to the aspect of the invention, it is preferable that the fixing part can be switched to a third state in which the image display unit is fixed to the frame in a third attitude different from the first attitude and the second attitude, and the control part changes the image displayed by the image display unit in response to switching between the first state or the second state and the third state based on the output signal of the detection part.

According to this configuration, for example, in the case where the attitude with respect to the frame is changed with the image display unit fixed to the frame and the image display unit is shifted from the center of the field of view of the observer, when the state of the image display unit is set to the third state, the image different from those in the first state and the second state is displayed and the image display is stopped, and thereby, facilities may be given to the observer.

In the head mount display according to the aspect of the invention, it is preferable that the fixing part is rotatably supported with respect to the image display unit or the frame, and the detection part detects a rotation state of the fixing part with respect to the image display unit or the frame.

According to this configuration, the image display unit is rotated with respect to the frame via the fixing part, and thereby, the attitude of the image display unit with respect to the frame may be changed. Further, the change in attitude may be determined based on the detection signal of the detection part.

In the head mount display according to the aspect of the invention, it is preferable that the fixing part is rotatably supported with respect to the image display unit and detachable from the frame.

According to this configuration, for example, the state in which the image display unit performs image display for the left eye of the observer and the state in which the image display unit performs image display for the right eye of the observer may be easily switched.

In the head mount display according to the aspect of the invention, it is preferable that the frame has a spectacle shape including a front part and temple parts connected to the front part.

According to this configuration, the spectacle-shaped head mount display may be realized.

In the head mount display according to the aspect of the invention, it is preferable that the fixing part is detachably provided in the temple part.

According to this configuration, the state in which the fixing part is attached to one temple part and the state in which the fixing part is attached to the other temple part are switched and the image display unit is rotated by 180° with respect to the fixing part, and thereby, the state in which the image display unit performs image display for the left eye of the observer and the state in which the image display unit performs image display for the right eye of the observer may be switched.

In the head mount display according to the aspect of the invention, it is preferable that the fixing part is provided in the front part.

According to this configuration, the image display unit is rotated by 180°, and thereby, the state in which the image display unit performs image display for the left eye of the observer and the state in which the image display unit performs image display for the right eye of the observer may be switched.

In the head mount display according to the aspect of the invention, it is preferable that the detection part has a magnet provided in the fixing part and a magnetic sensor provided in the image display unit.

According to this configuration, the relative attitude of the image display unit with respect to the frame may be detected without contact.

In the head mount display according to the aspect of the invention, it is preferable that the detection part has a plurality of parts having different reflectances provided in the fixing part and a light receiving device provided in the image display unit.

According to this configuration, the relative attitude of the image display unit with respect to the frame may be detected without contact.

In the head mount display according to the aspect of the invention, it is preferable that the detection part has a plurality of parts having different heights provided in the fixing part and a distance sensor provided in the image display unit.

According to this configuration, the relative attitude of the image display unit with respect to the frame may be detected without contact.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, preferred embodiments of a head mount display will be explained with reference to the accompanying drawings.

First Embodiment

Figure 1:
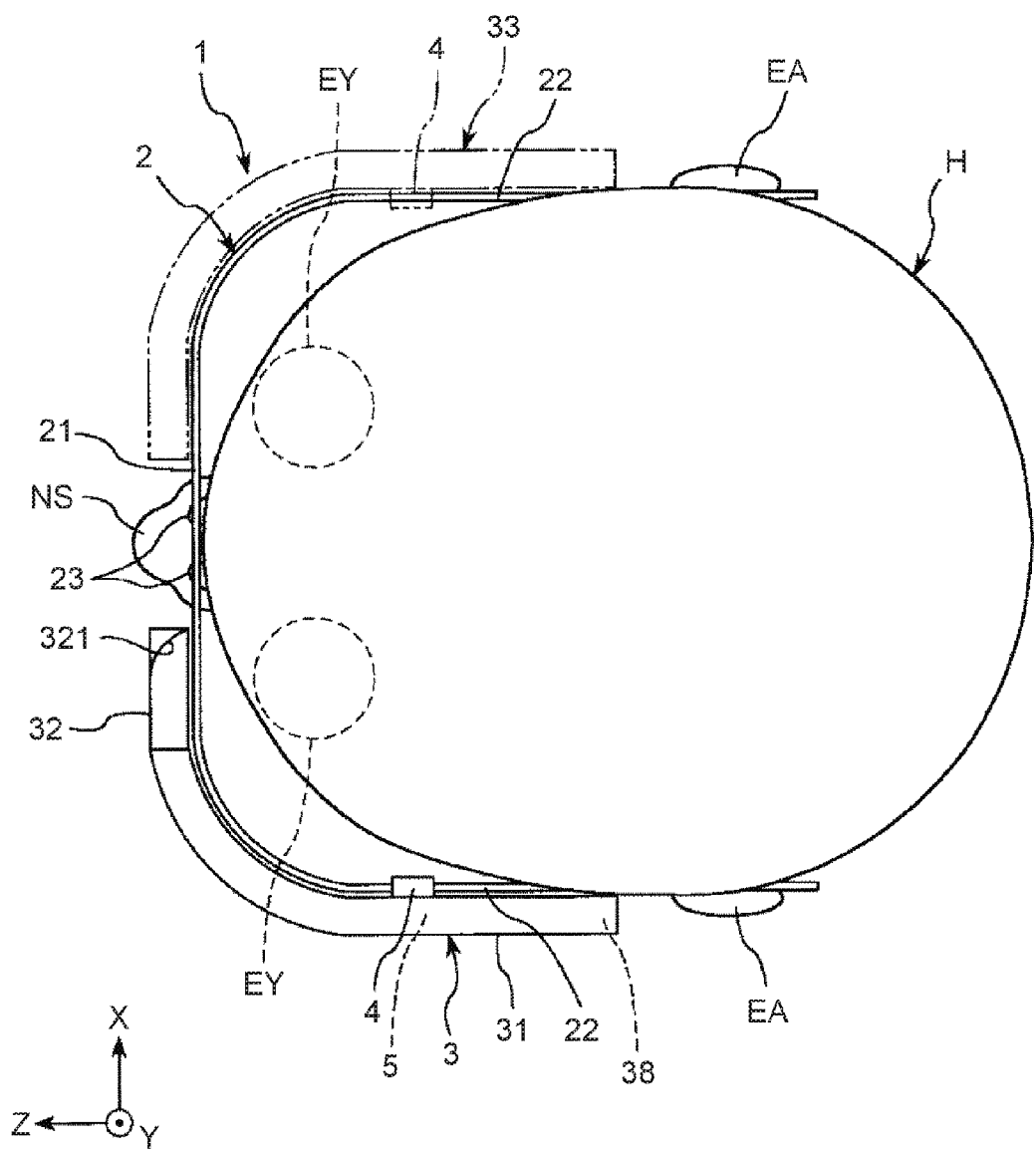
FIG. 1 shows a schematic configuration of a head mount display according to the first embodiment.
Figure 2:
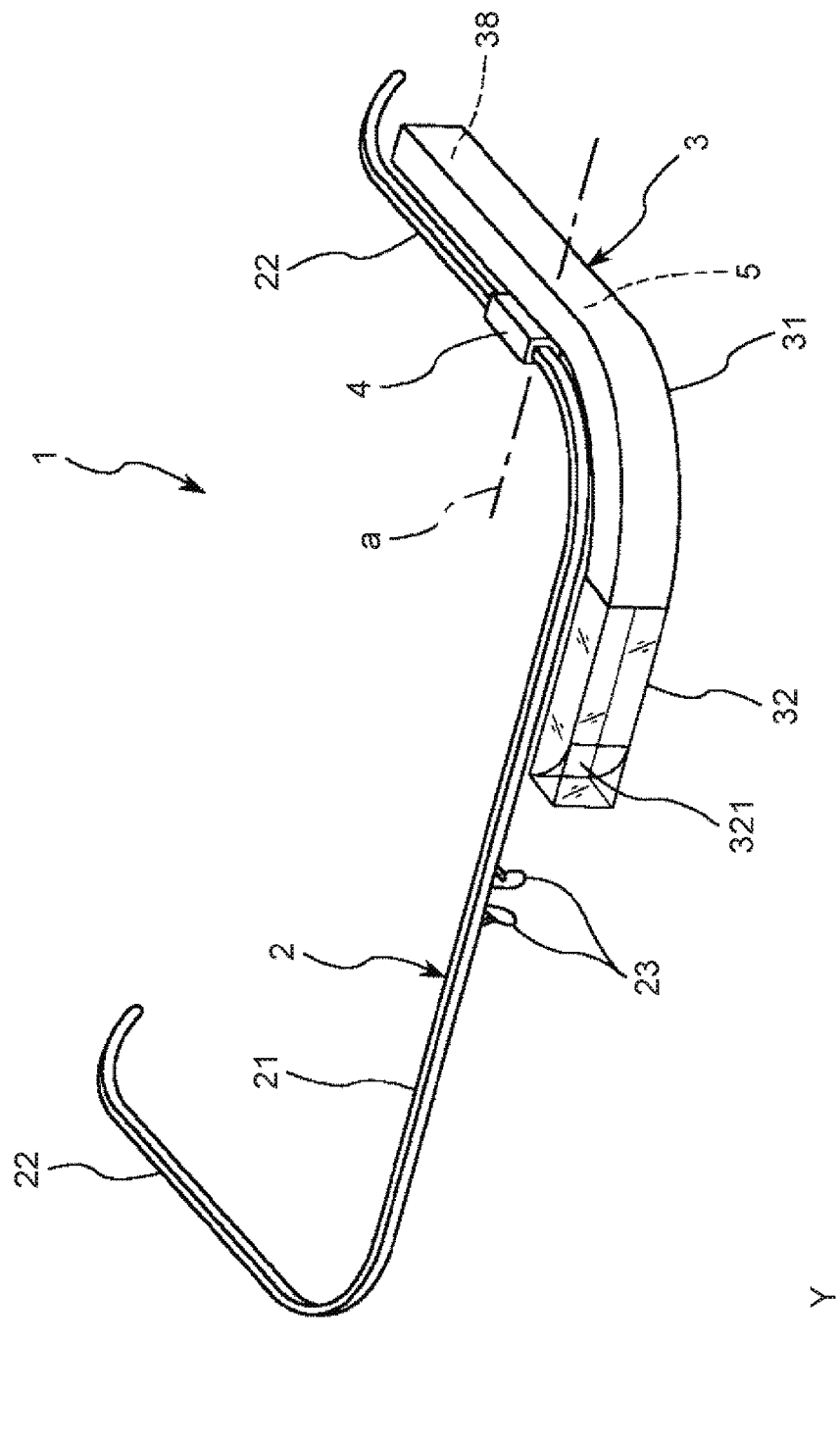
FIG. 2 is a perspective view of the head mount display shown in FIG. 1.
Figure 3:
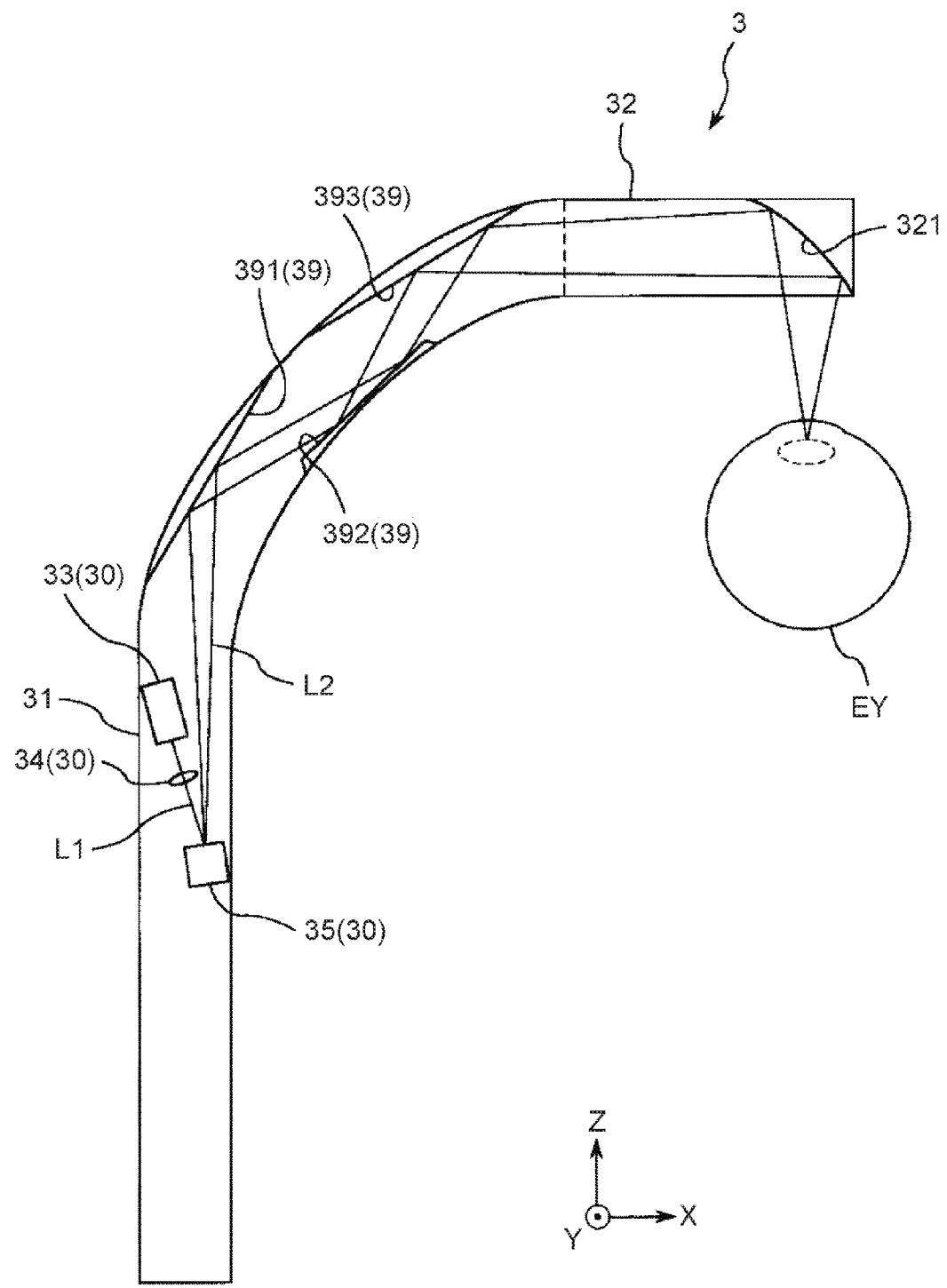
FIG. 3 is a schematic configuration diagram of an image display unit of the head mount display shown in FIG. 1.
Figure 4:
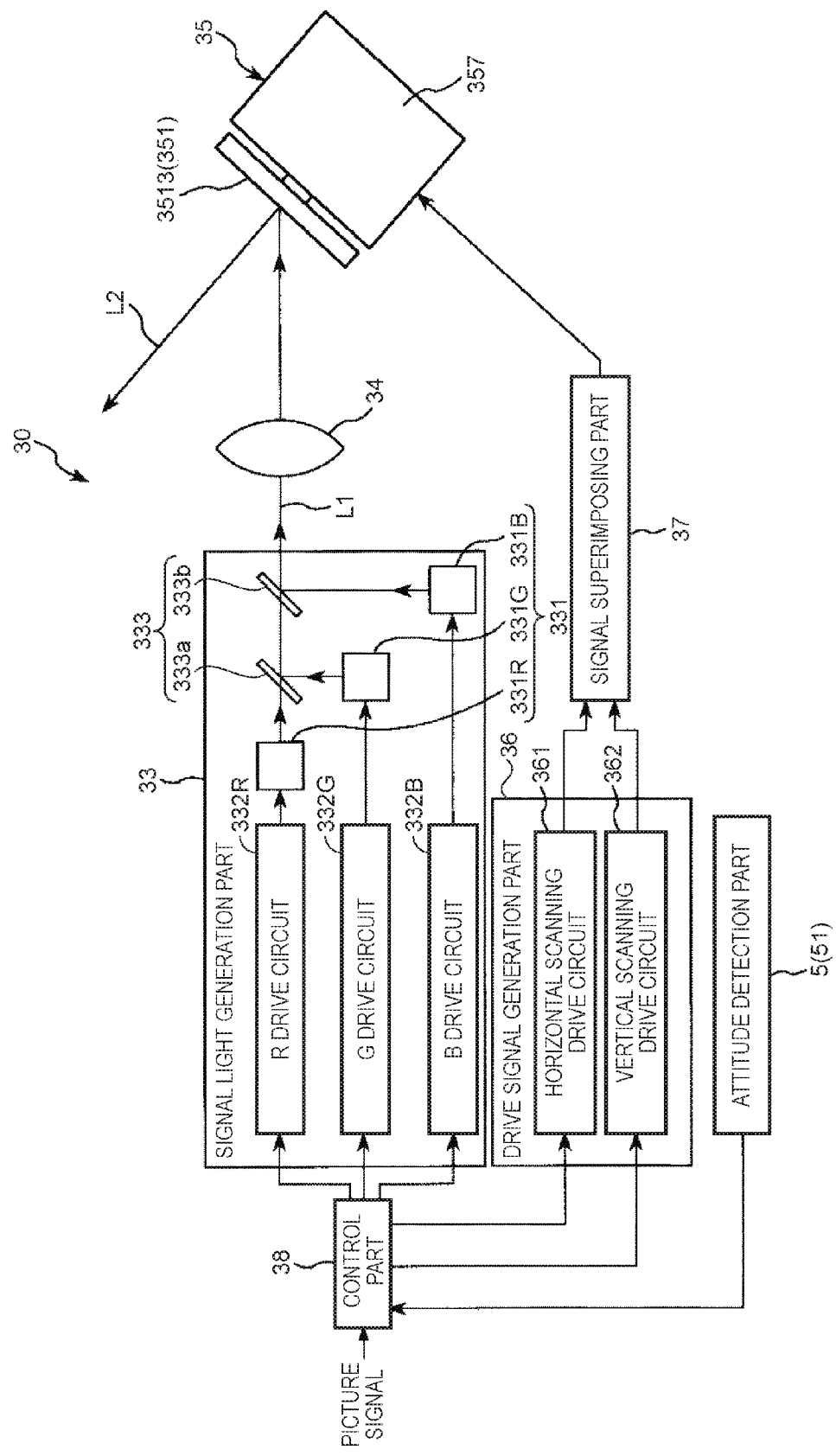
FIG. 4 is a schematic configuration diagram of a picture light generation part shown in FIG. 3.
Figure 5:
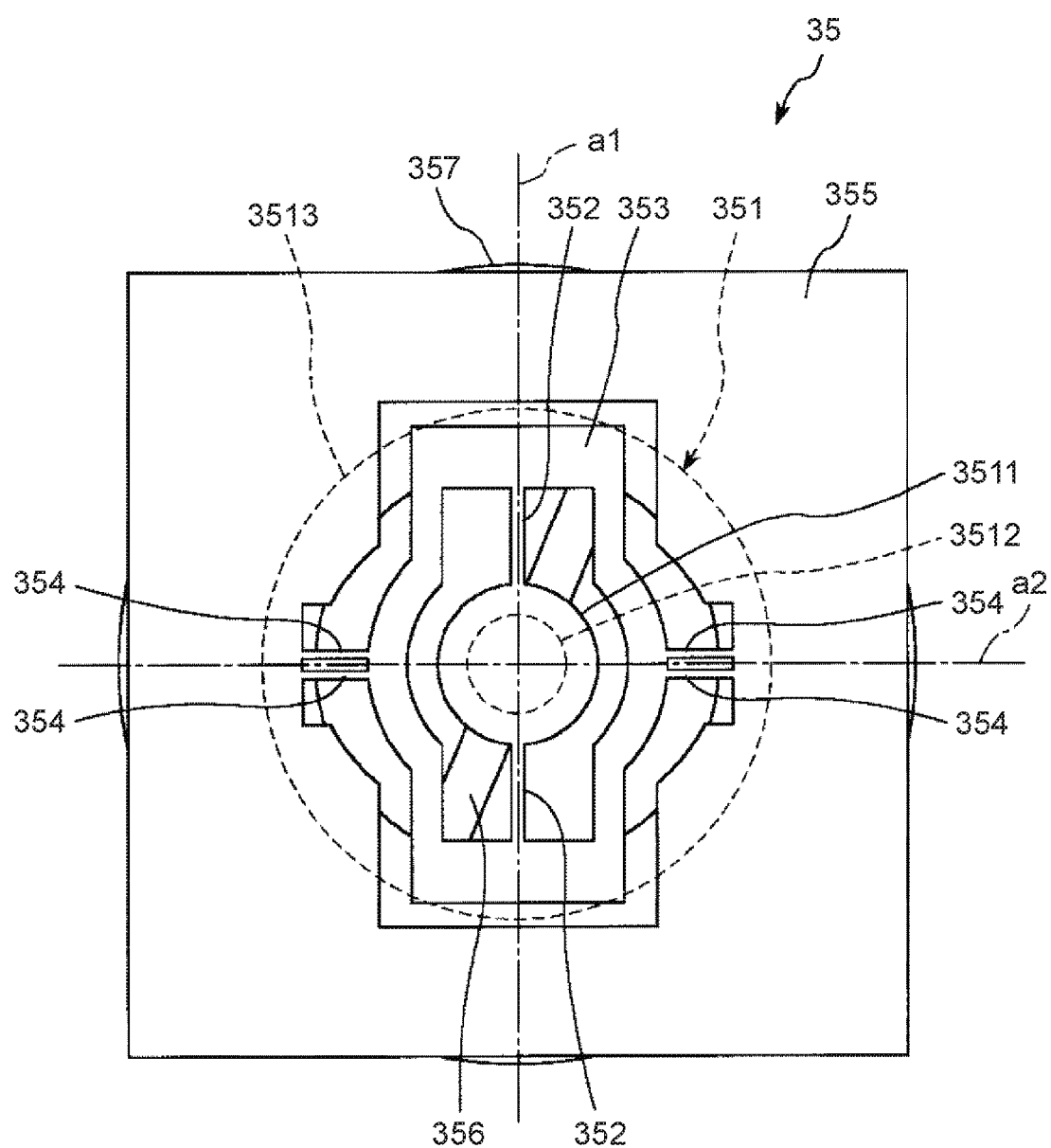
FIG. 5 is a plan view of an optical scanner shown in FIG. 4.
Figure 6:
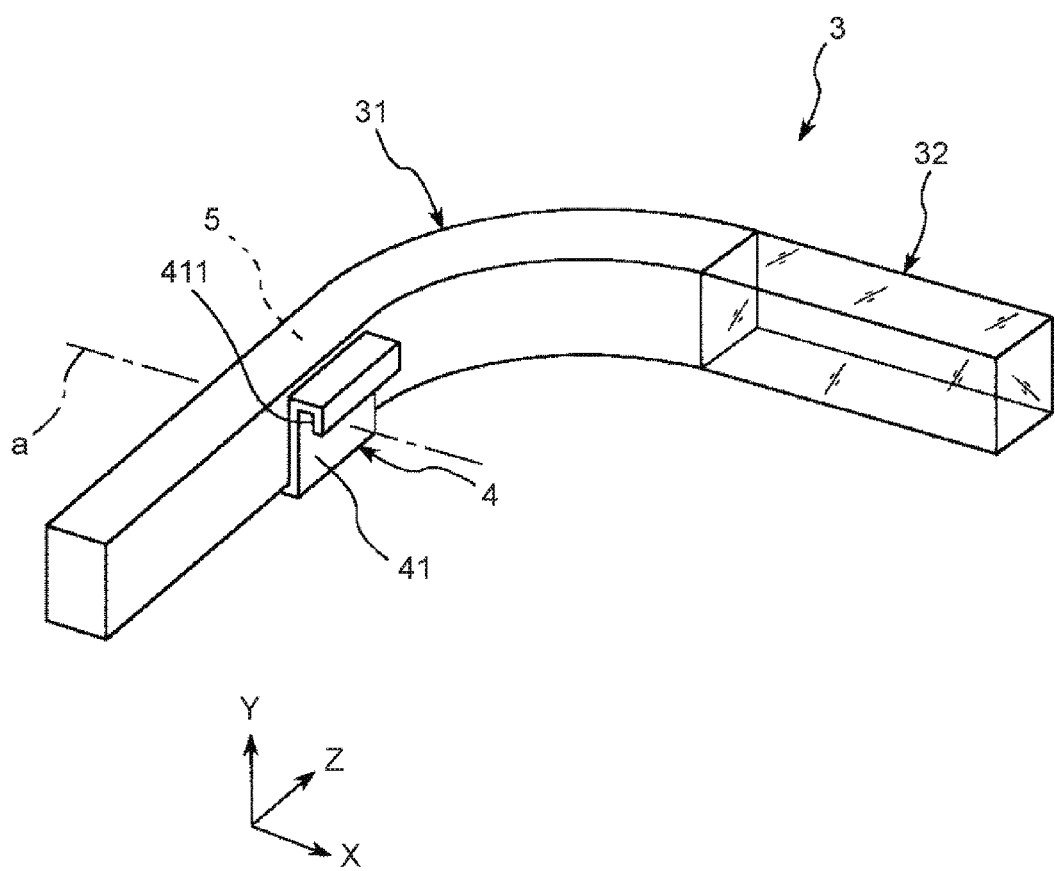
FIG. 6 is a perspective view for explanation of a fixing part shown in FIG. 1.
Figure 7:
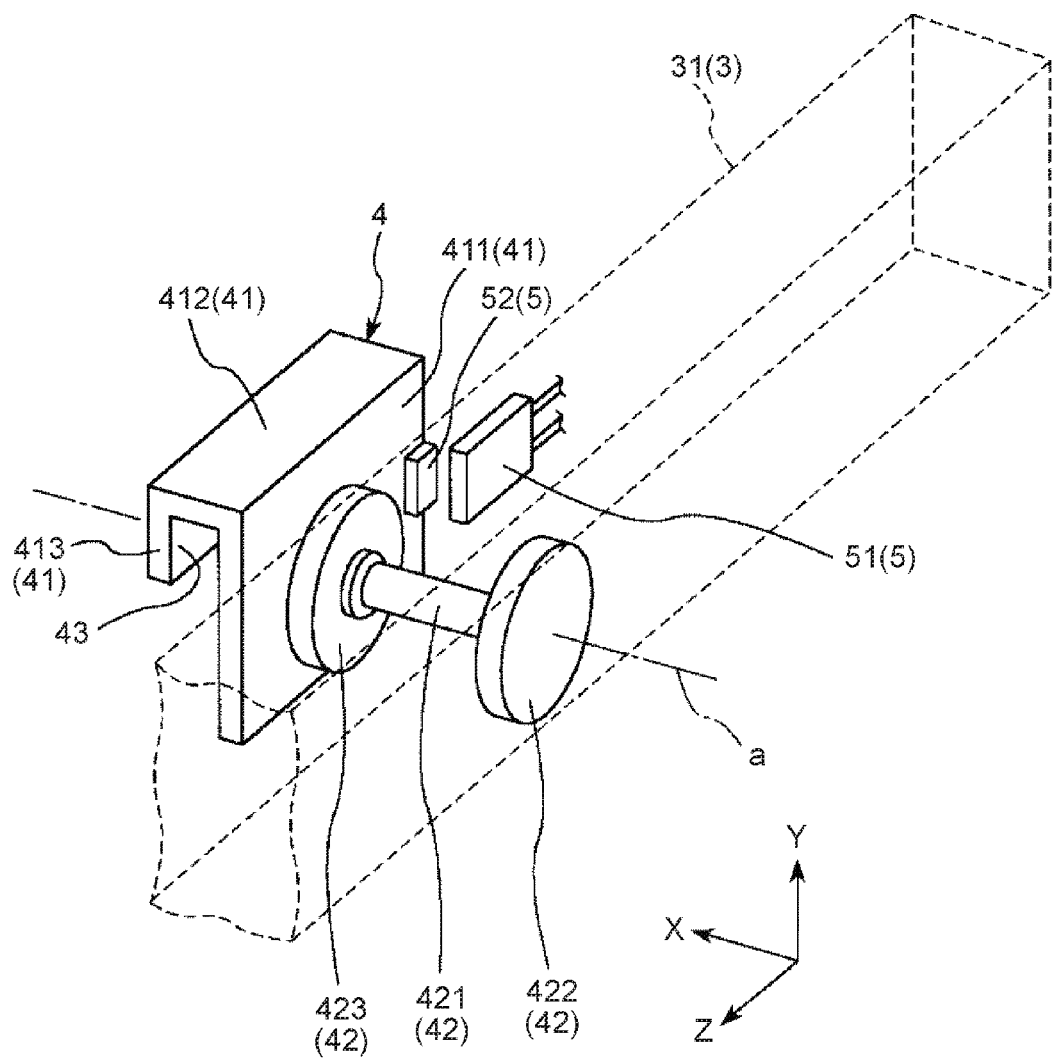
FIG. 7 is a perspective view for explanation of the fixing part and an attitude detection part shown in FIG. 6.
Figure 8:
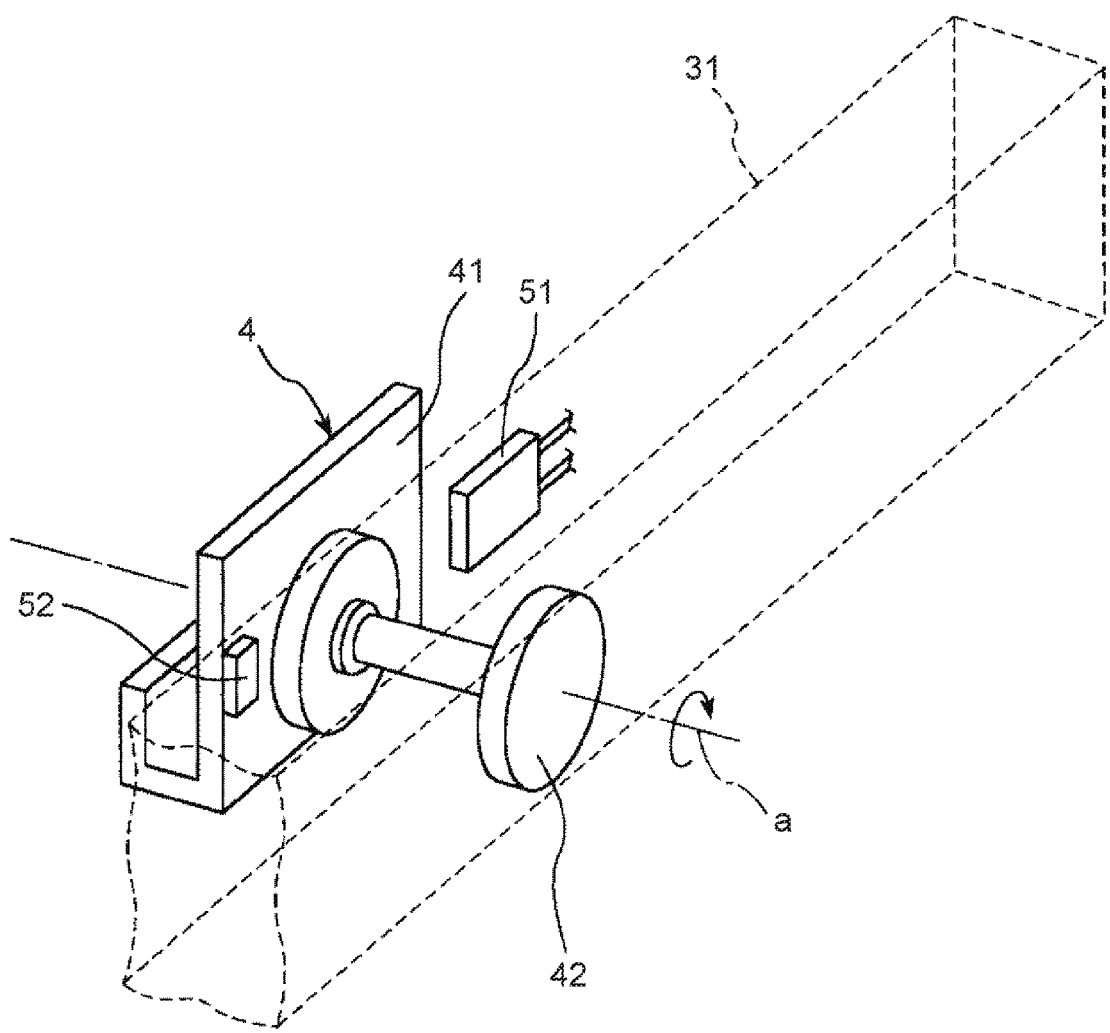
FIG. 8 is a perspective view for explanation of a state in which the fixing part shown in FIG. 6 is rotated with respect to the image display unit.
Figure 9:
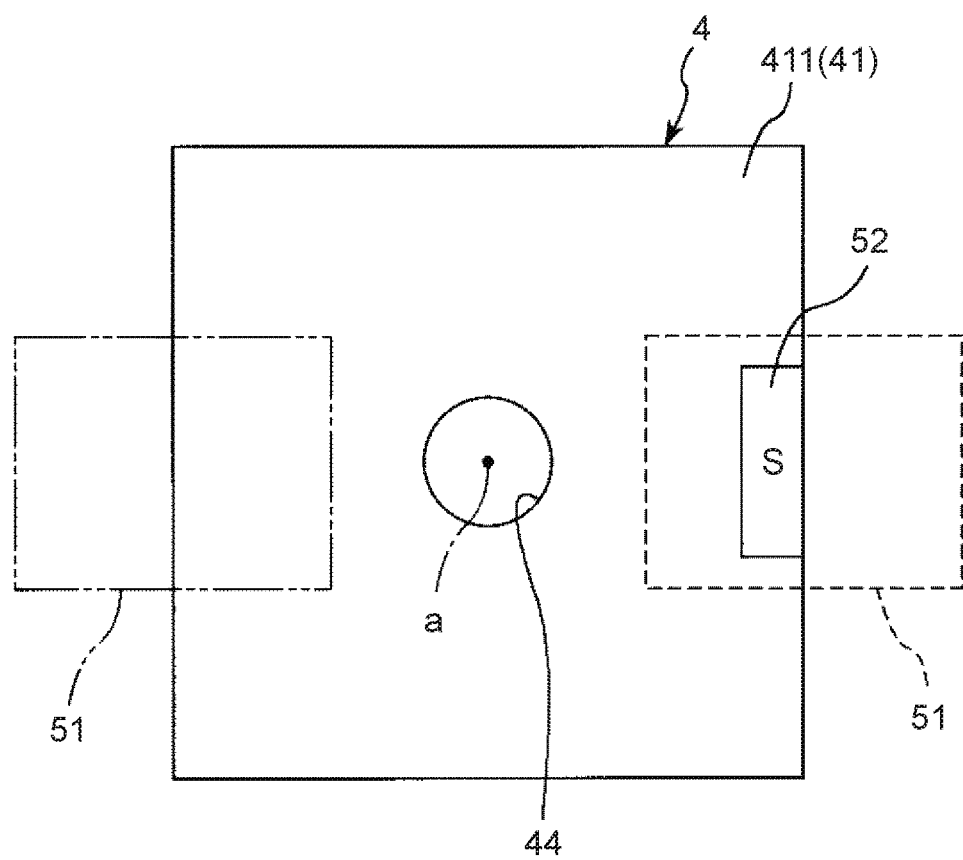
FIG. 9 is a diagram for explanation of detection of a rotation state of the fixing part by the attitude detection part shown in FIG. 6.

FIG. 1 shows a schematic configuration of a head mount display according to the first embodiment. FIG. 2 is a perspective view of the head mount display shown in FIG. 1. FIG. 3 is a schematic configuration diagram of an image display unit of the head mount display shown in FIG. 1. FIG. 4 is a schematic configuration diagram of a picture light generation part shown in FIG. 3. FIG. 5 is a plan view of an optical scanner shown in FIG. 4. FIG. 6 is a perspective view for explanation of a fixing part shown in FIG. 1. FIG. 7 is a perspective view for explanation of the fixing part and an attitude detection part shown in FIG. 6. FIG. 8 is a perspective view for explanation of a state in which the fixing part shown in FIG. 6 is rotated with respect to the image display unit. FIG. 9 is a diagram for explanation of detection of a rotation state of the fixing part by the attitude detection part shown in FIG. 6.

Note that, in FIGS. 1 to 3, 6, 7, for convenience of explanation, as three axes orthogonal to one another, an X-axis, a Y-axis, and a Z-axis are shown and the tip end sides of the illustrated arrows are "+" and the base end sides are "−". Further, the directions in parallel to the X-axis are referred to as "X-axis directions", the directions in parallel to the Y-axis are referred to as "Y-axis directions", and the directions in parallel to the Z-axis are referred to as "Z-axis directions". Here, the X-axis, the Y-axis, and the Z-axis are set so that, when a head mount display 1, which will be described later, is attached to a head H of an observer, the Y-axis directions may be upward and downward directions, the Z-axis directions may be leftward and rightward directions of the head H, and the X-axis directions may be anterior and posterior directions of the head H.

As shown in FIG. 1, the head mount display 1 (head mounted image display apparatus) has an appearance like spectacles, is attached to the head H of the observer for use, and allows the observer to visually recognize an image as a virtual image superposed on an outside world image.

As shown in FIG. 1, the head mount display 1 has a frame 2 attached to the head H of the observer, an image display unit 3 that displays images to be visually recognized by the observer with the frame 2 attached thereto, a fixing part 4 that fixes the image display unit 3 to the frame 2, and an attitude detection part 5 that detects a relative attitude of the image display unit 3 with respect to the frame 2.

Here, the head mount display 1 is the so-called monocular head mount display and the image display unit 3 irradiates one (left in FIG. 1) eye EY of the observer with picture light and displays an image. Further, the fixing part 4 is adapted to be detachable from the frame 2 and change the attachment position of the fixing part 4 and the attitude of the image display unit 3 with respect to the frame 2, and thereby, assume a first state in which the image display unit 3 performs image display for the left eye EY of the observer as shown by a solid line in FIG. 1 and a second state in which the image display unit 3 performs image display for the right eye EY of the observer as shown by a dashed-two dotted line in FIG. 1. Note that, as below, the case where the image display unit 3 is in the first state will be explained unless otherwise noted.

As below, the respective parts of the head mount display 1 will be sequentially explained.

Frame

The frame 2 has a function of supporting the image display unit 3 via the fixing part 4. As shown in FIGS. 1 and 2, the frame 2 has a shape like a spectacle frame. The frame 2 has a front part 21 extending in the X-axis directions, a pair of temple parts 22 extending from both ends of the front part 21 in the −Z-axis direction, and a nose pad part 23 provided in the center portion in the X-axis directions of the front part 21.

As shown in FIG. 1, the frame 2 is attached to the head H of the observer with the pair of temple parts 22 in contact with ears EA on both sides of the observer and the nose pad part 23 in contact with a nose NS of the observer in use.

Further, a constituent material of the frame 2 is not particularly limited. The same material as the constituent material of a known spectacle frame including e.g. a resin material, a metal material, and fiber-reinforced plastic may be used.

The shape of the frame 2 is not limited to that illustrated as long as the frame may be attached to the head H of the observer. Further, as the frame 2, ready-made spectacles, sunglasses, or the like may be used.

Image Display Unit

The image display unit 3 has a function of irradiating the eye EY of the observer with picture light and displaying an image. As shown in FIG. 3, the image display unit 3 has a casing 31, a half mirror 32 connected to the casing 31, and a picture light generation part 30 and an optical system 39 provided within the casing 31.

Casing

The casing 31 has a shape extending over a part between the front part 21 and one temple part 22 of the above described frame 2 along the parts (elongated shape) in the state in which the image display unit 3 is fixed to the frame 2 via the fixing part 4. In other words, the casing 31 has a first portion extending along the Z-axis directions and a second portion bending or curving from the end of the first portion in the +Z-axis direction in the X-axis direction in the state in which the image display unit 3 is fixed to the frame 2 via the fixing part 4. Further, one end of the casing 31 (the end on the above described second portion side) has an opening portion open in the +X-axis direction (not shown).

A constituent material of the casing 31 includes, but not particularly limited to, e.g. a resin material, a metal material, or the like. Note that the outer shape of the casing 31 is an example and includes, but not particularly limited to, e.g. a block shape, a flat shape, or the like.

Picture Light Generation Part

The picture light generation part 30 is provided within the above described casing 31. As shown in FIG. 4, the picture light generation part 30 has a signal light generation part 33 that generates a signal light L1 (modulated light) intensity-modulated according to a picture signal (image information), a lens 34 into which the signal light L1 from the signal light generation part 33 enters, a light scanning part 35 for scanning of the signal light L1 passing through the lens 34, a drive signal generation part 36 that generates a horizontal scanning drive signal and a vertical scanning drive signal used for driving of the light scanning part 35, a signal superimposing part 37 that superimposes the two signals from the drive signal generation part 36, and a control part 38 that controls the signal light generation part 33 and the drive signal generation part 36.

The signal light generation part 33 has a plurality of light sources 331R, 331G, 331B (light sources 331) at different wavelengths and a plurality of drive circuits 332R, 332G, 332B, and a light combining part 333.

The light source 331R (R light source) has a function of outputting red light, the light source 331G (G light source) has a function of outputting green light, and the light source 331B (B light source) has a function of outputting blue light. These lights of three colors are used, and thereby, a full-color image may be displayed. The light sources 331R, 331G, 331B are respectively not particularly limited. For example, laser diodes, LEDs, or the like may be used. The light sources 331R, 331G, 331B are electrically connected to the drive circuits 332R, 332G, 332B, respectively.

The drive circuit 332R has a function of driving the above described light source 331R, the drive circuit 332G has a function of driving the above described light source 331G, and the drive circuit 332B has a function of driving the above described light source 331B. The three (three color) lights output from the light sources 331R, 331G, 331B driven by the drive circuits 332R, 332G, 332B enter the light combining part 333.

The light combining part 333 has a function of combining the lights from the plurality of light sources 331R, 331G, 331B. In the embodiment, the light combining part 333 has a dichroic mirror 333a that transmits the red light from the light source 331R and reflects the green light from the light source 331G, and a dichroic mirror 333b that transmits the red light from the light source 331R and the green light from the light source 331G and reflects the blue light from the light source 331B. These two dichroic mirrors 333a, 333b are used, and thereby, the three lights of the red light, the green light, and the blue light from the light sources 331R, 331G, 331B are combined to generate one signal light L1.

Note that the light combining part 333 is not limited to the above described configuration using the dichroic mirrors, but may include e.g. prisms, optical waveguides, optical fibers, or the like.

The signal light L1 generated by the signal light generation part 33 enters the lens 34.

The lens 34 has a function of adjusting the radiation angle of the signal light L1. The lens 34 is e.g. a collimator lens. The signal light L1 passing through the lens 34 enters the light scanning part 35.

The light scanning part 35 is an optical scanner and has a function of generating a picture light L2 (scanning light) by two-dimensional scanning of the signal light L1 from the signal light generation part 33. As shown in FIG. 5, the light scanning part 35 includes a movable mirror portion 351, two axis portions 352, a frame body portion 353, four (two pairs of) axis portions 354, a supporting portion 355, a magnet 356, and a coil 357.

Here, the movable mirror portion 351 and the two axis portions 352 form "first vibration system" that torsionally vibrates about an axis line a1 with the movable mirror portion 351 as "first mass" and the two axis portions 352 as "first springs". Further, the movable mirror portion 351, the two axis portions 352, the frame body portion 353, the four axis portions 354, and the magnet 356 form "second vibration system" that torsionally vibrates about an axis line a2 orthogonal to the axis line a1 with the movable mirror portion 351, the two axis portions 352, the frame body portion 353, and the magnet 356 as "second mass" and the four axis portions 354 as "second spring".

The movable mirror portion 351 has a base portion 3511 and a light reflection plate 3513 fixed to the base portion 3511 via a spacer 3512. The base portion 3511, the spacer 3512, and the light reflection plate 3513 are formed using e.g. a silicon material. Further, the base portion 3511 is integrally formed with the axis portions 352, the frame body portion 353, the axis portions 354, and the supporting portion 355. Furthermore, the respective parts between the base portion 3511, the spacer 3512, and the light reflection plate 3513 are joined by a method using a joining material such as an adhesive agent or a brazing material, a solid joining method, or the like. Note that the spacer 3512 and the light reflection plate 3513 may be formed using a glass material or integrally formed.

A light reflection portion having light reflectivity (not shown) is provided on the surface of the light reflection plate 3513 opposite to the base portion 3511. Further, the base portion 3511 of the movable mirror portion 351 is surrounded by the frame body portion 353 in the plan view. That is, the frame body portion 353 has a frame shape and is provided to surround the base portion 3511.

The base portion 3511 is supported swingably about the axis line a1 by the frame body portion 353 via the two axis portions 352. Further, the frame body portion 353 is supported swingably about the axis line a2 orthogonal to the axis line a1 by the supporting portion 355 via the four axis portions 354. Furthermore, angle detection sensors (not shown) such as e.g. piezoelectric resistive elements are provided in at least either axis portions of the axis portions 352 or the axis portions 354. The angle detection sensors output signals according to the swing angles about the axis lines a1, a2 of the movable mirror portion 351. The output is input to the control part 38 via a cable (not shown).

To the surface of the above described frame body portion 353 opposite to the light reflection plate 3513, the magnet 356 is joined using an adhesive agent or the like. The magnet 356 has a longitudinal shape extending along a direction tilted with respect to the axis line a1 and the axis line a2. As the magnet 356, e.g. neodymium magnet, ferrite magnet, samarium-cobalt magnet, alnico magnet, bonded magnet, or the like may be preferably used.

The coil 357 is provided beneath the magnet 356. The drive signal generation part 36 is electrically connected to the coil 357 via the signal superimposing part 37. Thereby, the horizontal scanning drive signal and the vertical scanning drive signal generated by the drive signal generation part 36 and superimposed by the signal superimposing part 37 are input to the coil 357.

As shown in FIG. 4, the drive signal generation part 36 has a drive circuit 361 that generates a horizontal scanning drive signal used for horizontal scanning of the light scanning part 35 and a drive circuit 362 that generates a vertical scanning drive signal used for vertical scanning of the light scanning part 35. Here, the horizontal scanning drive signal and the vertical scanning drive signal are respectively signals at voltages changing in periods different from each other. More specifically, for example, the frequency of the horizontal scanning drive signal is set to be equal to the torsional resonance frequency of the above described first vibration system of the light scanning part 35, and the frequency of the vertical scanning drive signal is set to a value different from the torsional resonance frequency of the second vibration system and smaller than the frequency of the horizontal scanning drive signal (for example, the frequency of the horizontal scanning drive signal is set to about 18 kHz and the frequency of the vertical scanning drive signal is set to be about 60 Hz).

The signal superimposing part 37 has an adder (not shown) that superimposes the above described horizontal scanning drive signal and vertical scanning drive signal, and applies the superimposed voltage to the coil 357 of the light scanning part 35. When the drive signal formed by superimposition of the horizontal scanning drive signal and vertical scanning drive signal is input to the coil 357, the movable mirror portion 351 swings about the axis line a1 at the frequency of the horizontal scanning drive signal and swings about the axis line a2 at the frequency of the vertical scanning drive signal.

The control part 38 has a function of controlling driving of the drive circuits 332R, 332G, 332B of the signal light generation part 33 and the drive circuits 361, 362 of the drive signal generation part 36 based on the picture signals (image signals). Thereby, the signal light generation part 33 generates the signal light L1 modulated according to the image information and the drive signal generation part 36 generates the horizontal scanning drive signal and the vertical scanning drive signal according to the image information. Further, the control part 38 has a function of controlling the drive signal generation part 36 based on the detection results of the angle detection sensors (not shown) provided in the light scanning part 35.

Furthermore, the control part 38 has a function of controlling driving of the signal light generation part 33 based on the detection result of the attitude detection part 5. In other words, the control part 38 has a function of controlling an image to be displayed by the image display unit 3 based on the output signal of the attitude detection part 5. More specifically, for example, the control part 38 determines whether the attachment position of the image display unit 3 to the frame 2 is the left side or the right side based on the detection result of the attitude detection part 5 and performs rotation processing of the picture signal based on the determination result. Note that the control using the detection result of the attitude detection part 5 will be described later in detail with the explanation of the attitude detection part 5.

The picture light L2 (a bundle of signal lights L1 at predetermined time intervals) generated by the picture light generation part 30 having the above described configuration enters the optical system 39 as shown in FIG. 3.

Optical System

The optical system 39 is provided within the above described casing 31. The optical system 39 has a function of guiding the picture light L2 from the picture light generation part 30 to the half mirror 32. The optical system 39 has a plurality of mirrors 391, 392, 393 provided within the casing 31.

The plurality of mirrors 391, 392, 393 may include e.g. metal thin films or dielectric multilayer films or hologram elements. When the hologram elements are used, the degree of freedom of placement of the plurality of mirrors 391, 392, 393 may be made higher. Note that the above described configuration of the optical system 39 is an example and determined depending on the placement of the picture light generation part 30, the shape of the casing 31, etc., but not limited to that. For example, the optical system may have another optical element such as a lens or the number of mirrors is arbitrary. Or, the optical system 39 may have an optical waveguide or optical fiber. Or, the optical system 39 may be omitted depending on the placement, the configuration, etc. of the picture light generation part 30.

The picture light L2 passing through the optical system 39 having the above described configuration enters the half mirror 32 as shown in FIG. 3.

Half Mirror

The half mirror 32 is connected to one end of the above described casing 31. The half mirror 32 has a function of reflecting the picture light L2 from the light scanning part 35 toward the eye EY of the observer and a function of transmitting outside world light toward the eye EY of the observer. Thereby, the observer may visually recognize the image (virtual image) formed by the picture light L2 while visually recognizing an outside world image. In other words, a see-through head mount display may be realized.

The half mirror 32 is formed using a colorless and transparent material. Here, the half mirror 32 has a reflection portion 321 that reflects the picture light L2. The half mirror 32 is formed principally using a colorless and transparent material (resin material, glass material, or the like), and the reflection portion 321 is formed by joining of two colorless and transparent materials having different refractive indices, for example. Further, on the reflection portion 321, a light-transmissive reflection film including a hologram element, a metal thin film, or a dielectric multilayer film may be provided.

Fixing Part

As shown in FIGS. 1 and 2, the fixing part 4 has a function of fixing the image display unit 3 to the frame 2. As shown in FIG. 2, the fixing part 4 is rotatably supported about an axis line a with respect to the image display unit 3 and adapted to be detachable from the frame 2. Thereby, the fixing part 4 can switch between a first state in which the image display unit 3 is fixed to the frame 2 in a first attitude as shown by a solid line in FIG. 1 (hereinafter, also simply referred to as "first state") and a second state in which the image display unit 3 is fixed to the frame 2 in a second attitude different from the first attitude as shown by a dashed-two dotted line in FIG. 1 (hereinafter, also simply referred to as "second state"). Here, the first state is a state in which the image display unit 3 performs image display for the left eye EY of the observer. On the other hand, the second state is a state in which the image display unit 3 performs image display for the right eye EY of the observer.

Specifically, as shown in FIGS. 6 and 7, the fixing part 4 has an engaging member 41 and a supporting member 42 that rotatably supports the engaging member 41 about the axis line a with respect to the casing 31.

The engaging member 41 has a function of detachably engaging with the temple part 22 of the frame 2. Thereby, the state in which the fixing part 4 is attached to one temple part 22 and the state in which the fixing part is attached to the other temple part 22 may be switched. The engaging member 41 has a plate-like first portion 41, a second portion stood from the end of the first portion 411, and a third portion 413 extending from the second portion 412 along the first portion 411. In the engaging member 41, a concave part 43 surrounded by the first portion 411, the second portion 412, and the third portion 413 is formed and the temple part 22 is caught in the concave part 43, and thereby, the engaging member 41 is attached to the temple part 22 while being fixed thereto by a friction force.

Note that the shape of the engaging member 41 is not limited to that described above. The fixing method of the engaging member 41 to the temple part 22 is not limited to that described above, but may be e.g. a method using a magnetic force, a method using a clip, or the like.

The supporting member 42 has a function of rotatably supporting the engaging member 41 about the axis line a with respect to the casing 31. Thereby, the fixing part 4 may be rotated about the axis line a with respect to the image display unit 3. The supporting member 42 has a shaft portion 421 penetrating the casing 31, a flange portion 422 provided on one end of the shaft portion 421, and a spacer portion 423 provided on the other end of the shaft portion 421. The shaft portion 421 extends along the axis line a and is inserted into a through hole (not shown) provided in the casing 31 rotatably about the axis line a. On one end of the shaft portion 421, the flange portion 422 is fixed outside of the casing 31. On the other hand, on the other end of the shaft portion 421, the first portion 411 of the engaging member 41 is fixed outside of the casing 31 and the spacer portion 423 is inserted between the casing 31 and the first portion 411. Note that the shaft portion 421 may be fixed to the casing 31 and the engaging member 41 may be attached to the shaft portion 421 rotatably about the axis line a. In this case, the engaging member 41 may be regarded as forming "fixing part".

The above described fixing part 4 is switched between the state in which the fixing part 4 is attached to one temple part 22 and the state in which the fixing part is attached to the other temple part 22 and the image display unit 3 is rotated by 180° with respect to the fixing part 4, and thereby, the first state in which the image display unit 3 performs image display for the left eye EY of the observer and the second state in which the image display unit 3 performs image display for the right eye EY of the observer as shown by a dashed-two dotted line in FIG. 1 may be assumed.

Attitude Detection Part

The attitude detection part 5 has a function of detecting the attitude of the engaging member 41 of the fixing part 4 with respect to the casing 31. In other words, the attitude detection part 5 has a function of detecting the attitude of the image display unit 3 with respect to the frame 2 in the state in which the fixing part 4 is fixed to the frame 2. The detection result of the attitude detection part 5 is used, and thereby, whether the attachment position of the image display unit 3 to the frame 2 is on the left side or the right side may be determined.

The attitude detection part 5 has a magnetic sensor 51 fixed to the casing 31 and a magnet 52 fixed to the fixing part 4.

The magnetic sensor 51 has a function of detecting magnetic strength of a part in the circumference direction of the engaging member 41 of the fixing part 4 in a position deflected from the axis line a. The magnetic sensor 51 includes, but not particularly limited to, e.g. a Hall element.

The magnet 52 is provided in the part in the circumference direction of the engaging member 41 of the fixing part 4 in the position deflected from the axis line a. The magnet 52 is not particularly limited, but e.g. neodymium magnet, ferrite magnet, samarium-cobalt magnet, alnico magnet, bonded magnet, or the like may be used.

According to the attitude detection part 5 having the above described configuration, in the first state in which the image display unit 3 performs image display for the left eye EY of the observer, the magnetic sensor 51 (the magnetic sensor 51 in the position shown by a broken line in FIG. 9) faces the magnet 52 as shown in FIG. 7. On the other hand, in the second state in which the image display unit 3 performs image display for the right eye EY of the observer, the magnetic sensor 51 (the magnetic sensor 51 in the position shown by a dashed-two dotted line in FIG. 9) does not face the magnet 52 (in other words, faces another part than the magnet 52 of the engaging member 41) as shown in FIG. 8. Therefore, the magnetic sensor 51 of the attitude detection part 5 outputs a signal according to the relative attitude of the image display unit 3 with respect to the frame 2. That is, the detection results of the magnetic sensor 51 differ between the first state and the second state. Accordingly, whether the first state or the second state may be determined based on the detection result of the magnetic sensor 51.

According to the above described head mount display 1, the attitude detection part 5 outputs a signal according to the relative attitude of the image display unit 3 with respect to the frame 2 and the control part 38 controls the image displayed by the image display unit 3 based on the output signal, and thereby, the image display unit 3 may display the image according to the relative attitude of the image display unit 3 with respect to the frame 2. Accordingly, regardless of the attitude of the head mount display 1, whether the image display unit 3 is attached to the left or the right of the frame 2 may be determined. Then, the displayed image of the image display unit 3 is appropriately rotated using the determination result, and thereby, in the monocular head mount display 1 switchable between left and right sides, suitable image display may be performed independent of the attitude of the observer (user) regardless of whether the image display unit 3 is attached to the left or the right of the frame 2.

Here, the fixing part 4 is rotatably supported with respect to the image display unit 3, thus, the image display unit 3 is rotated with respect to the frame 2 via the fixing part 4, and thereby, the attitude of the image display unit 3 with respect to the frame 2 may be changed. In addition, the fixing part 4 is detachable from the frame 2, and thus, the first state in which the image display unit 3 performs image display for the left eye EY of the observer and the second state in which the image display unit 3 performs image display for the right eye EY of the observer may be easily switched. Further, the attitude detection part 5 detects the rotation state of the fixing part 4 with respect to the image display unit 3 and outputs a signal according to the relative attitude of the image display unit 3 with respect to the frame 2, and thus, the change in attitude may be determined based on the detection signal of the attitude detection part 5.

Then, the control part 38 rotates the image displayed by the image display unit 3 by 180° in response to the switching between the first state and the second state based on the output signal of the attitude detection part 5. According to the configuration, in the head mount display 1 that changes the attitude of the image display unit 3 with respect to the frame 2 to switch between the first state in which the image display unit 3 performs image display for the left eye EY of the observer and the second state in which the image display unit 3 performs image display for the right eye EY of the observer, image display may be suitably performed without turning the image upside down for the observer in either state of the first state or the second state.

In the embodiment, in the spectacle-shaped head mount display 1, the fixing part 4 rotatably supported with respect to the image display unit 3 is detachably provided from the temple 22 of the frame 2. According to the configuration, the state in which the fixing part 4 is attached to one temple part 22 and the state in which the fixing part 4 is attached to the other temple part 22 are switched and the image display unit 3 is rotated by 180° with respect to the fixing part 4, and thereby, the first state in which the image display unit 3 performs image display for the left eye EY of the observer and the second state in which the image display unit 3 performs image display for the right eye EY of the observer may be switched.

Further, the attitude detection part 5 has the magnet 52 provided on the fixing part 4 and the magnetic sensor 51 provided in the image display unit 3 (casing 31), and thereby, may detect the relative attitude of the image display unit 3 with respect to the frame 2 without contact.

Second Embodiment

Next, the second embodiment will be explained.

Figure 10:
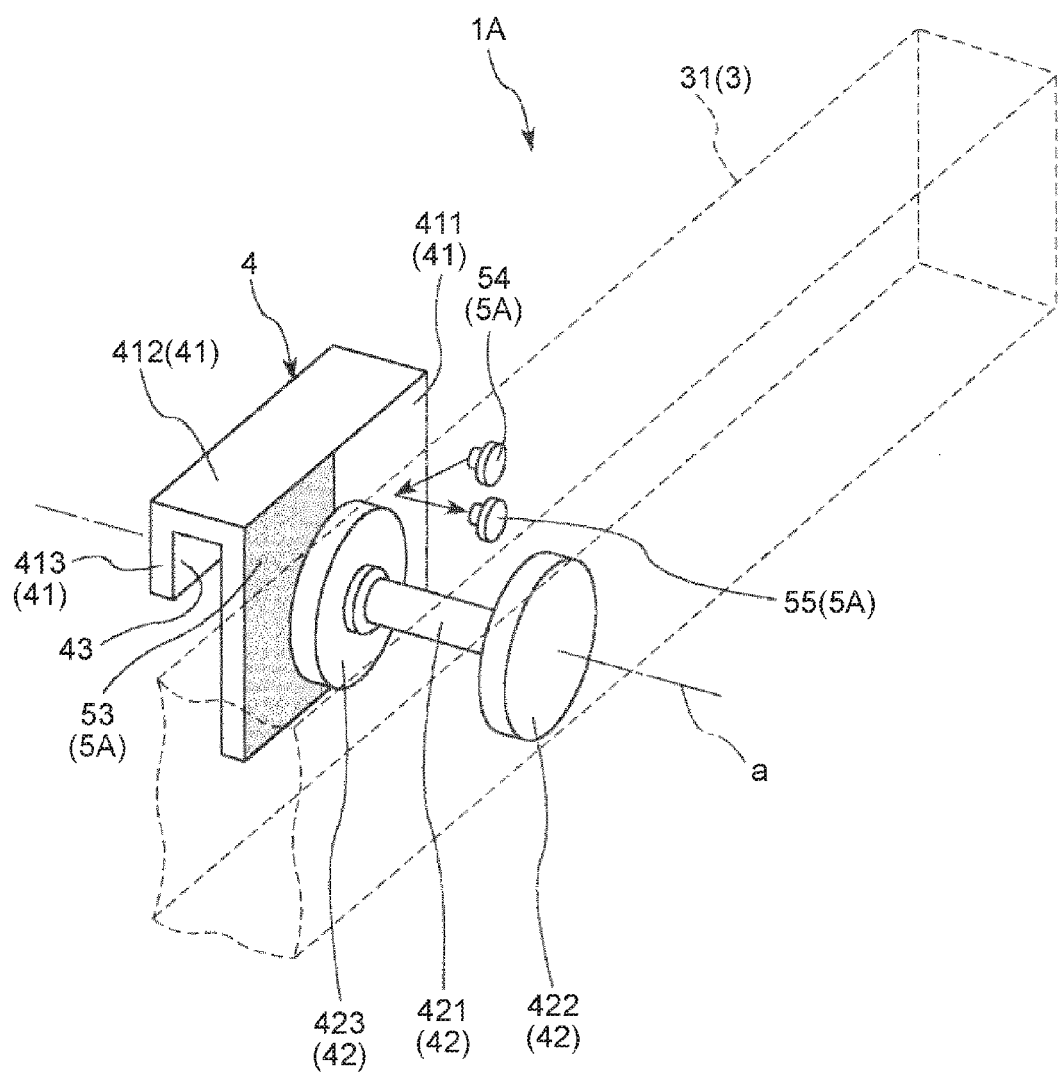
FIG. 10 is a perspective view for explanation of a fixing part and an attitude detection part of a head mount display according to the second embodiment.
Figure 11:
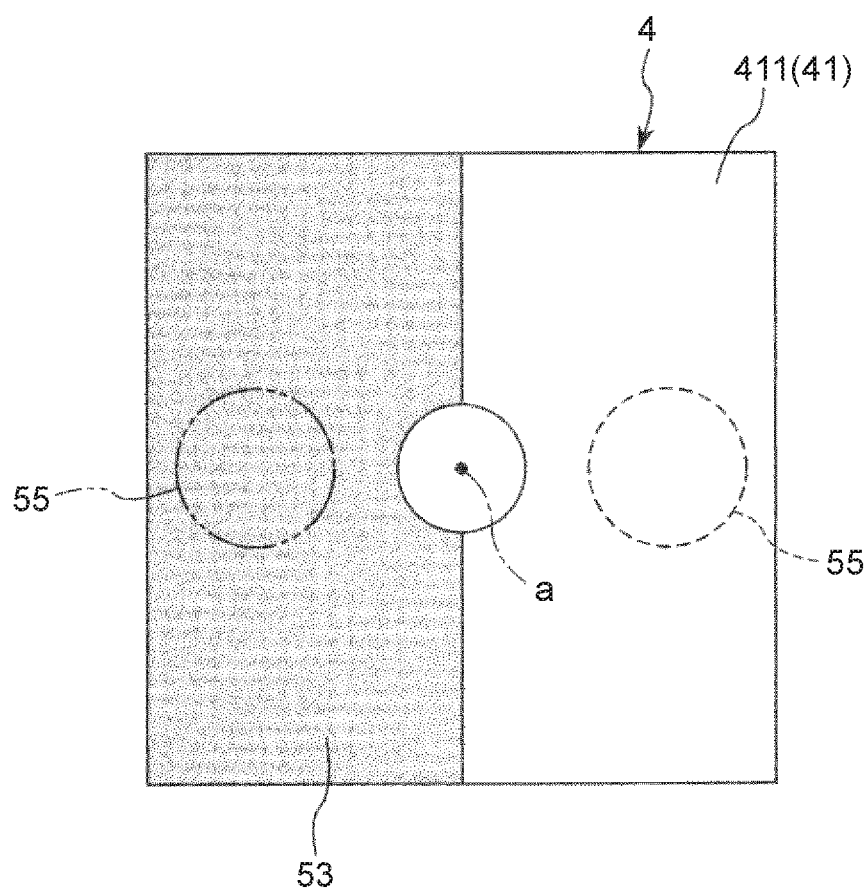
FIG. 11 is a diagram for explanation of detection of a rotation state of the fixing part by the attitude detection part shown in FIG. 10.

FIG. 10 is a perspective view for explanation of a fixing part and an attitude detection part of a head mount display according to the second embodiment. FIG. 11 is a diagram for explanation of detection of a rotation state of the fixing part by the attitude detection part shown in FIG. 10.

The embodiment is the same as the above described first embodiment except that the configuration of the attitude detection part is different.

As below, the second embodiment will be explained with a focus on the differences from the above described first embodiment and the explanation of the same items will be omitted. Further, in FIGS. 10 and 11, the same configurations as those of the above described embodiment have the same signs.

The head mount display 1A of the embodiment includes an attitude detection part 5A that detects the attitude of the fixing part 4 with respect to the image display unit 3.

The attitude detection part 5A has a light emitting device 54 and a light receiving device 55 fixed to the casing 31, and a low-reflection part 53 provided in a part of the surface of the fixing part 4.

The light emitting device 54 has a function of irradiating the surface of the first portion 411 of the engaging member 41 with light. The light emitting device 54 is not particularly limited, but e.g. various light emitting devices including alight emitting diode and a laser diode may be used. The light receiving device 55 is placed in a position deflected from the axis line a and has a function of detecting whether or not there is a reflected light formed by reflection of the light from the light emitting device 54 by the engaging member 41 of the fixing part 4. The light receiving device 55 is not particularly limited, but e.g. various light receiving devices including a photodiode may be used.

The low-reflection part 53 is provided in a part in the circumference direction of the engaging member 41 of the fixing part 4. In the drawing, the low-reflection part is provided over an entire of one area of two areas formed by splitting the surface of the first portion 411. The low-reflection part 53 is not particularly limited as long as the part has the lower light reflectance than that of the surface of the first portion 411, and may be formed by black painting, roughening treatment, or the like.

According to the attitude detection part 5A having the above described configuration, in the first state in which the image display unit 3 performs image display for the left eye EY of the observer, the light receiving device 55 (the light receiving device 55 in the position shown by a broken line in FIG. 11) does not face the low-reflection part 53 (in other words, faces another part than the low-reflection part 53 of the engaging member 41). On the other hand, in the second state in which the image display unit 3 performs image display for the right eye EY of the observer, the light receiving device 55 (the light receiving device 55 in the position shown by a dashed-two dotted line in FIG. 11) faces the low-reflection part 53. Therefore, the detection results (received light intensity) of the light receiving device 55 differ between the first state and the second state. Accordingly, whether the first state or the second state may be determined based on the detection result of the light receiving device 55.

As described above, the attitude detection part 5A has the plurality of parts having different reflectances provided in the fixing part 4 (the low-reflection part 53 on the surface of the engaging member 41 on the image display unit 3 side and the other parts) and the light receiving device 55 provided in the image display unit 3. According to the attitude detection part 5A, the relative attitude of the image display unit 3 with respect to the frame 2 may be detected without contact.

Third Embodiment

Next, the third embodiment will be explained.

Figure 12:
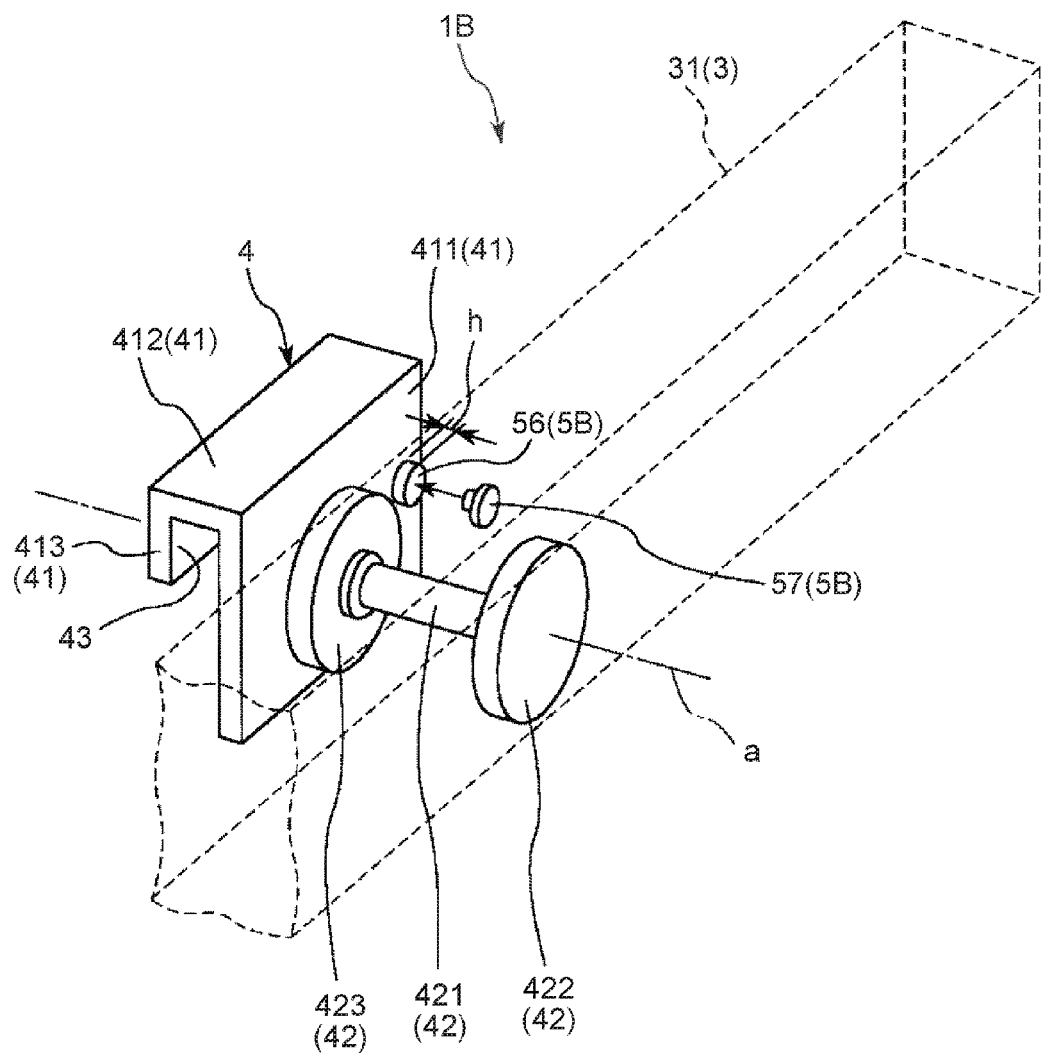
FIG. 12 is a perspective view for explanation of a fixing part and an attitude detection part of a head mount display according to the third embodiment.
Figure 13:
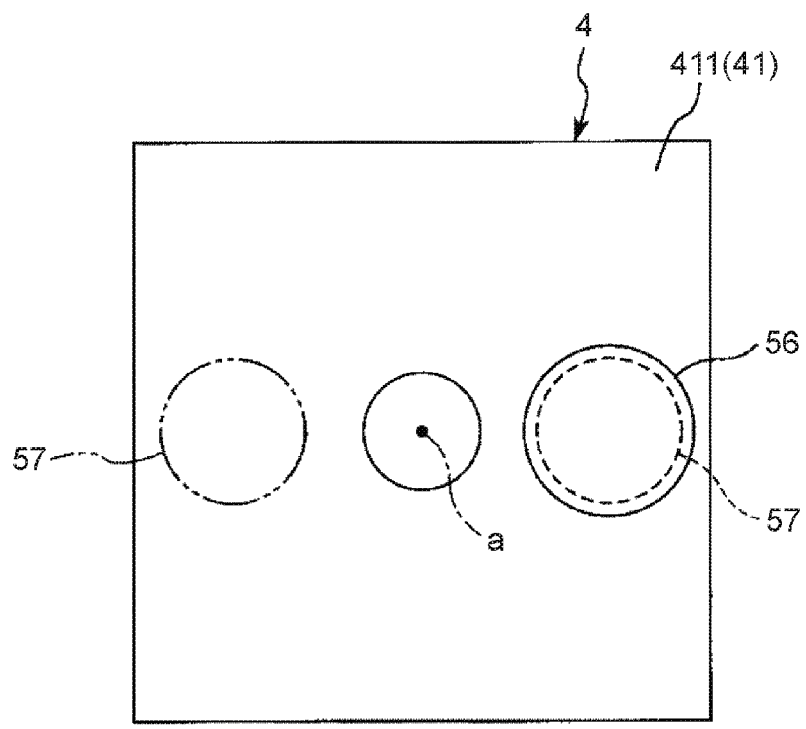
FIG. 13 is a diagram for explanation of detection of a rotation state of the fixing part by the attitude detection part shown in FIG. 12.

FIG. 12 is a perspective view for explanation of a fixing part and an attitude detection part of a head mount display according to the third embodiment. FIG. 13 is a diagram for explanation of detection of a rotation state of the fixing part by the attitude detection part shown in FIG. 12.

The embodiment is the same as the above described first embodiment except that the configuration of the attitude detection part is different.

As below, the third embodiment will be explained with a focus on the differences from the above described first embodiment and the explanation of the same items will be omitted. Further, in FIGS. 12 and 13, the same configurations as those of the above described embodiment have the same signs.

The head mount display 1B of the embodiment includes an attitude detection part 5B that detects the attitude of the fixing part 4 with respect to the image display unit 3.

The attitude detection part 5B has a distance sensor 57 fixed to the casing 31, and a protrusion 56 having a height h and provided in a part of the surface of the fixing part 4.

The distance sensor 57 has a function of detecting a distance between the engaging member 41 as a measuring object and itself. The distance sensor 57 is not particularly limited, but e.g. a self-coupling distance sensor, a distance sensor using a light emitting device (e.g. laser diode) and a light receiving device (e.g. line sensor), or the like may be used.

The protrusion 56 is provided in a part in the circumference direction of the engaging member 41 of the fixing part 4. The range in which the protrusion 56 is formed may be an entire of one area of two areas formed by splitting the surface of the first portion 411. Or, in place of the protrusion 56, a concave portion may be provided in the engaging member 41.

According to the attitude detection part 5B having the above described configuration, in the first state in which the image display unit 3 performs image display for the left eye EY of the observer, the distance sensor 57 (the distance sensor 57 in the position shown by a broken line in FIG. 13) faces the protrusion 56. On the other hand, in the second state in which the image display unit 3 performs image display for the right eye EY of the observer, the distance sensor 57 (the distance sensor 57 in the position shown by a dashed-two dotted line in FIG. 13) does not face the protrusion 56 (in other words, faces another part than the protrusion 56 of the engaging member 41). Therefore, the detection results (detected distances) of the distance sensor 57 differ between the first state and the second state. Accordingly, whether the first state or the second state may be determined based on the detection result of the distance sensor 57.

As described above, the attitude detection part 5B has the plurality of parts having different heights provided in the fixing part 4 (the protrusion 56 on the surface of the engaging member 41 on the image display unit 3 side and the other parts) and the distance sensor 57 provided in the image display unit 3. According to the attitude detection part 5B, the relative attitude of the image display unit 3 with respect to the frame 2 may be detected without contact.

Fourth Embodiment

Next, the fourth embodiment will be explained.

Figure 14:
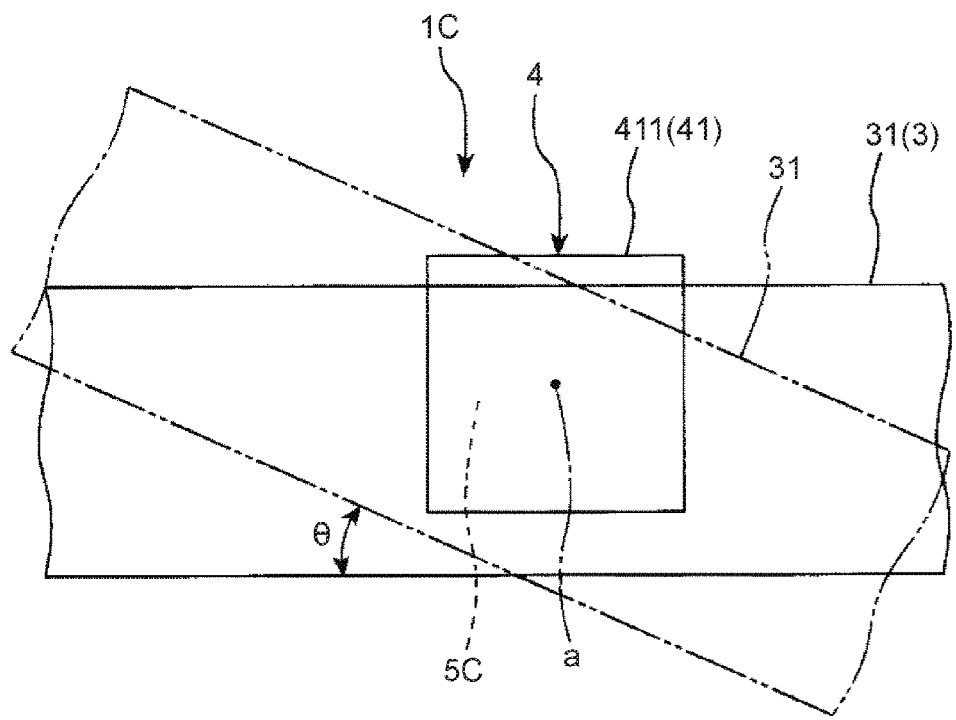
FIG. 14 shows a head mount display according to the fourth embodiment.
Figure 15:
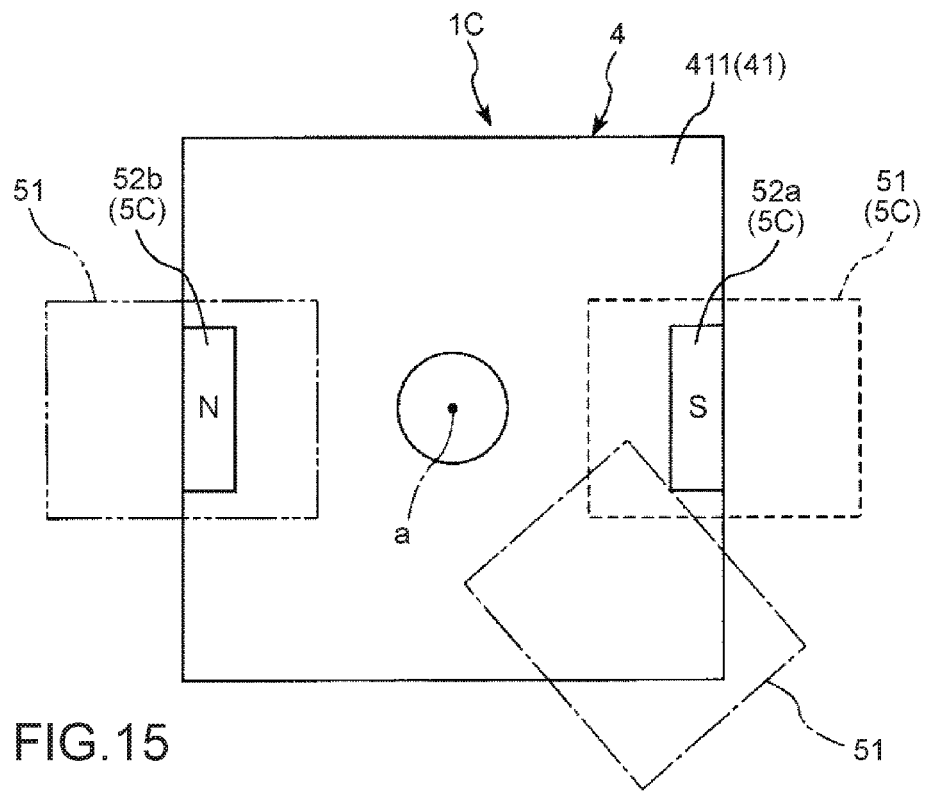
FIG. 15 is a diagram for explanation of detection of a rotation state of a fixing part by an attitude detection part shown in FIG. 14.

FIG. 14 shows a head mount display according to the fourth embodiment. FIG. 15 is a diagram for explanation of detection of a rotation state of a fixing part by an attitude detection part shown in FIG. 14.

The embodiment is the same as the above described first embodiment except that the configuration of the attitude detection part (the number of magnets) is different.

As below, the fourth embodiment will be explained with a focus on the differences from the above described first embodiment and the explanation of the same items will be omitted. Further, in FIGS. 14 and 15, the same configurations as those of the above described embodiment have the same signs.

The head mount display 1C of the embodiment includes an attitude detection part 5C that detects the attitude of the fixing part 4 with respect to the image display unit 3.

The attitude detection part 5C is adapted to detect a third state in which the image display unit 3 rotates by a predetermined angle $\theta$ about the axis line a with respect to the fixing part 4 as shown in FIG. 14 (hereinafter, also simply referred to as "third state"). More specifically, the attitude detection part 5C has the magnetic sensor 51 fixed to the casing 31, and two magnets 52a, 52b provided in a part of the surface of the fixing part 4. Here, polarities of the magnet 52a and the magnet 52b on the magnetic sensor 51 side are different from each other. Note that the polarities of the magnets 52a and the magnet 52b may be the same only if the magnetic strengths are different from each other. Further, the angle $\theta$ is not particularly limited, but preferably from 10° to 170° and more preferably from 20° to 160°.

According to the attitude detection part 5C, in the first state in which the image display unit 3 performs image display for the left eye EY of the observer, the magnetic sensor (the magnetic sensor 51 in the position shown by a broken line in FIG. 15) faces the magnet 52a. On the other hand, in the second state in which the image display unit 3 performs image display for the right eye EY of the observer, the magnetic sensor 51 (the magnetic sensor 51 in the position shown by a dashed-two dotted line in FIG. 15) faces the magnet 52b.

Further, in another state than the above described first state and the second state, in the third state in which the image display unit 3 rotates by the predetermined angle θ about the axis line a with respect to the fixing part 4, the magnetic sensor 51 (the magnetic sensor 51 in the position shown by a dashed dotted line in FIG. 15) does not face either the magnet 52a or 52b (in other words, faces another part than the magnets 52a, 52b of the engaging member 41). Therefore, the detection results (detected magnetic strengths) of the magnetic sensor 51 differ among the first state, the second state, and the third state. Accordingly, not only whether the first state or the second state but also the third state in which the image display unit 3 rotates by the predetermined angle θ about the axis line a with respect to the fixing part 4 may be determined based on the detection result of the magnetic sensor 51.

When the third state is determined, the image display of the image display unit 3 may be made different from that of the first state or the second state. The modes of the displayed image in the third state include e.g. a mode of stopping the image display of the image display unit 3, a mode of reducing brightness of the displayed image, a mode of reducing the display area, a mode of indication of the third state, etc., and one of the modes may be used singly or a combination of two or more of the modes may be used.

As described above, in the case where the fixing part 4 can be switched not only to the first state and the second state but also to the third state in which the image display unit 3 is fixed in a third attitude different from the first attitude and the second attitude with respect to the frame 2, the control part 38 changes the image displayed by the image display unit in response to the switching between the first state or the second state and the third state based on the output signal of the attitude detection part 5. Thereby, for example, in the third state in which the attitude with respect to the frame 2 is changed with the image display unit 3 fixed to the frame 2 and the image display unit 3 is shifted from the center of the field of view of the observer, the image different from those in the first state and the second state is displayed and the image display is stopped, and thereby, facilities may be given to the observer.

Fifth Embodiment

Next, the fifth embodiment will be explained.

Figure 16:
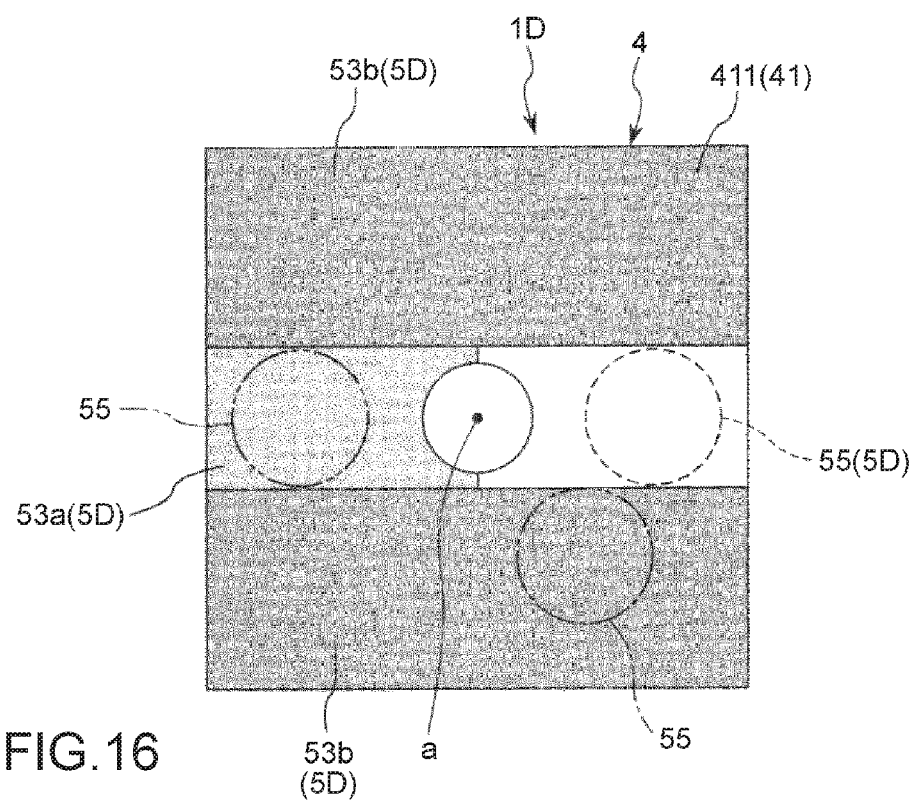
FIG. 16 is a diagram for explanation of a fixing part and an attitude detection part of a head mount display according to the fifth embodiment.

FIG. 16 is a diagram for explanation of a fixing part and an attitude detection part of a head mount display according to the fifth embodiment.

The embodiment is the same as the above described first embodiment except that the configuration of the attitude detection part is different. Further, the configuration of the attitude detection part of the embodiment is the same as that of the above described second embodiment except that the configuration of the low-reflection part is different.

As below, the fifth embodiment will be explained with a focus on the differences from the above described first embodiment and the explanation of the same items will be omitted. Further, in FIG. 16, the same configurations as those of the above described embodiment have the same signs.

The head mount display 1D of the embodiment includes an attitude detection part 5D that detects the attitude of the fixing part 4 with respect to the image display unit 3.

The attitude detection part 5D is adapted to detect a rotation of the image display unit 3 about the axis line a by a predetermined angle θ with respect to the fixing part 4. More specifically, the attitude detection part 5D is the same as the attitude detection part 5A of the second embodiment except that low-reflection parts 53a, 53b are provided in place of the low-reflection part 53 of the second embodiment. Here, the reflectance of the low-reflection part 53b with respect to the light from the light emitting device 54 is lower than the reflectance of the low-reflection part 53a with respect to the light from the light emitting device 54.

According to the attitude detection part 5D, in the first state in which the image display unit 3 performs image display for the left eye EY of the observer, the light receiving device 55 (the light receiving device 55 in the position shown by a broken line in FIG. 16) does not face either the low-reflection part 53a or 53b (in other words, faces another part than the low-reflection part 53a, 53b of the engaging member 41). On the other hand, in the second state in which the image display unit 3 performs image display for the right eye EY of the observer, the light receiving device 55 (the light receiving device 55 in the position shown by a dashed-two dotted line in FIG. 16) faces the low-reflection part 53a.

Further, in another state than the above described first state or second state, in the third state in which the image display unit 3 rotates by the predetermined angle θ about the axis line a with respect to the fixing part 4, the light receiving device 55 (the light receiving device 55 in the position shown by a dashed dotted line in FIG. 16) faces the low-reflection part 53b. Therefore, the detection results (received light intensity) of the light receiving device 55 differ among the first state, the second state, and the third state, and not only whether the first state or the second state but also the third state in which the image display unit 3 rotates by the predetermined angle θ about the axis line a with respect to the fixing part 4 may be determined based on the detection result of the light receiving device 55.

Sixth Embodiment

Next, the sixth embodiment will be explained.

Figure 17:
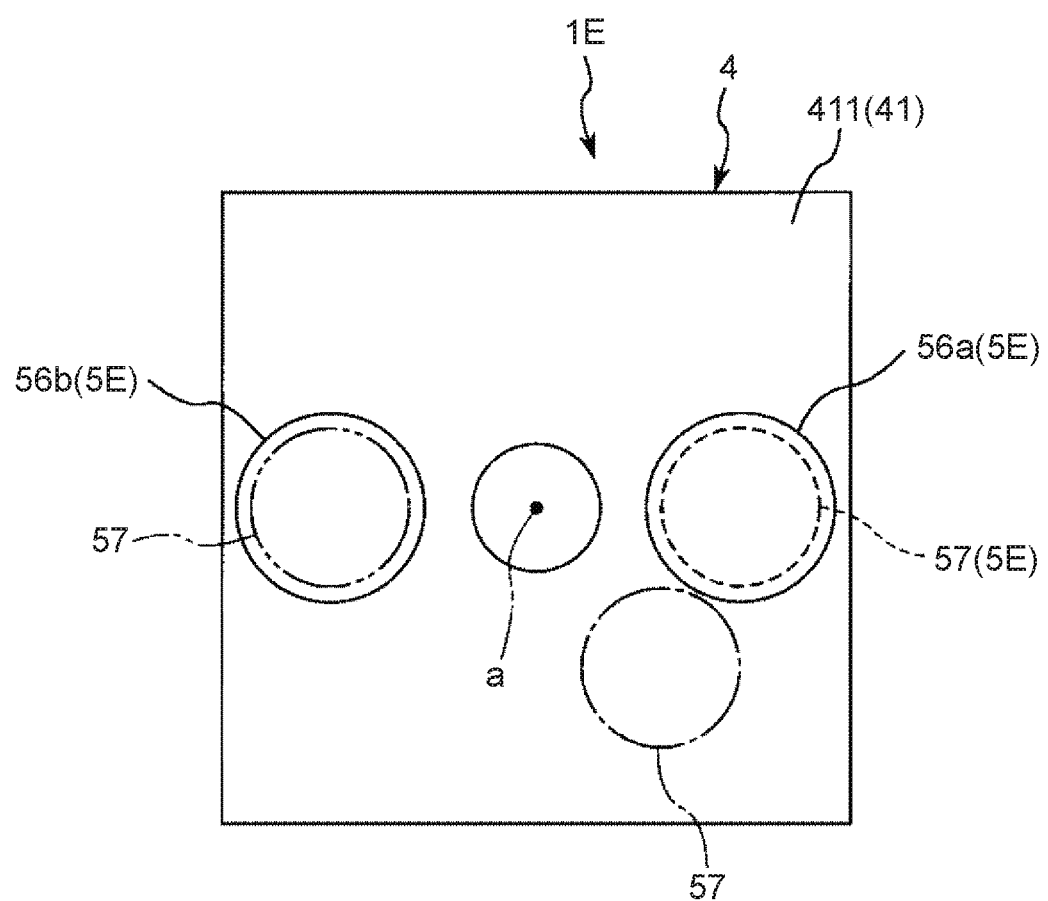
FIG. 17 is a diagram for explanation of a fixing part and an attitude detection part of a head mount display according to the sixth embodiment.

FIG. 17 is a diagram for explanation of a fixing part and an attitude detection part of a head mount display according to the sixth embodiment.

The embodiment is the same as the above described first embodiment except that the configuration of the attitude detection part is different. Further, the configuration of the attitude detection part of the embodiment is the same as that of the above described third embodiment except that the configuration of the protrusion portion is different.

As below, the sixth embodiment will be explained with a focus on the differences from the above described first embodiment and the explanation of the same items will be omitted. Further, in FIG. 17, the same configurations as those of the above described embodiment have the same signs.

The head mount display 1E of the embodiment includes an attitude detection part 5E that detects the attitude of the fixing part 4 with respect to the image display unit 3.

The attitude detection part 5E is adapted to detect a rotation of the image display unit 3 about the axis line a by a predetermined angle θ with respect to the fixing part 4. More specifically, the attitude detection part 5E is the same as the attitude detection part 5B of the third embodiment except that two protrusions 56*a*, 56*b* are provided in place of the protrusion 56 of the third embodiment. Here, the heights of the protrusions 56*a*, 56*b* are different from each other.

According to the attitude detection part 5E, in the first state in which the image display unit 3 performs image display for the left eye EY of the observer, the distance sensor 57 (the distance sensor 57 in the position shown by a broken line in FIG. 17) faces the protrusion 56*a*. On the other hand, in the second state in which the image display unit 3 performs image display for the right eye EY of the observer, the distance sensor 57 (the distance sensor 57 in the position shown by a dashed-two dotted line in FIG. 17) faces the protrusion 56*b*.

Further, in another state than the above described first state and second state, in the third state in which the image display unit 3 rotates by the predetermined angle θ about the axis line a with respect to the fixing part 4, the distance sensor 57 (the distance sensor 57 in the position shown by a dashed-one dotted line in FIG. 17) does not face either the protrusion 56*a* or 56*b* (in other words, faces another part than the protrusions 56*a*, 56*b* of the engaging member 41). Therefore, the detection results (detected distances) of the distance sensor 57 differ among the first state, the second state, and the third state. Accordingly, not only whether the first state or the second state but also the third state in which the image display unit 3 rotates by the predetermined angle θ about the axis line a with respect to the fixing part 4 may be determined based on the detection result of the distance sensor 57.

Seventh Embodiment

Next, the seventh embodiment will be explained.

Figure 18:
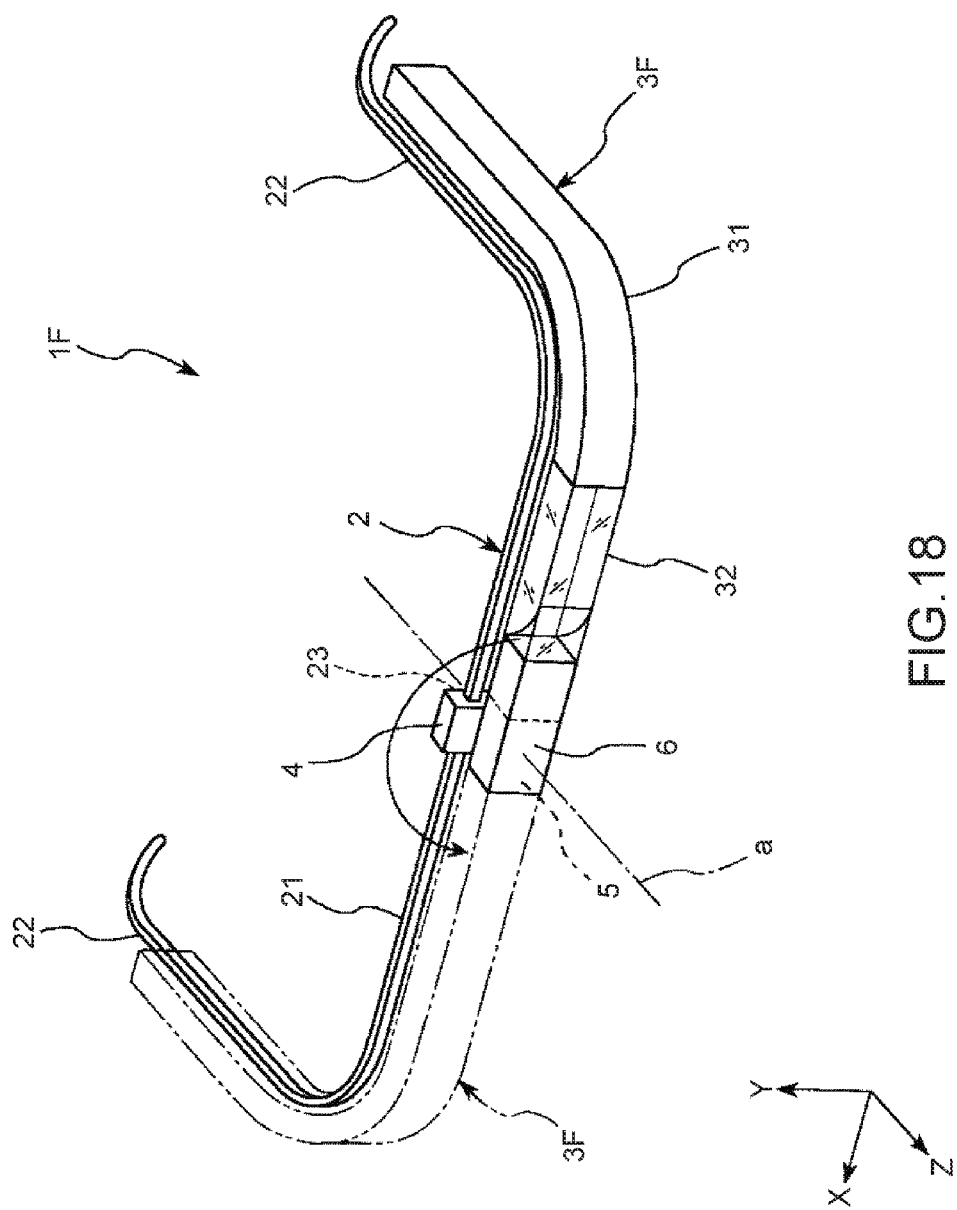
FIG. 18 is a perspective view showing a head mount display according to the seventh embodiment.

FIG. 18 is a perspective view showing a head mount display according to the seventh embodiment.

The embodiment is the same as the above described first embodiment except that the configuration of the image display unit and the attachment position of the fixing part are different.

As below, the seventh embodiment will be explained with a focus on the differences from the above described first embodiment and the explanation of the same items will be omitted. Further, in FIG. 17, the same configurations as those of the above described embodiment have the same signs.

The head mount display 1F of the embodiment includes an image display unit 3F fixed to the frame 2 via the fixing part 4.

The image display unit 3F has a supporting part 6 provided on the half mirror 32 on the opposite side to the casing 31. The supporting part 6 is attached to a part near the nose pad part 23 of the front part 21 of the frame 2 via the fixing part 4.

In the embodiment, the fixing part 4 is attached to the supporting part 6 rotatably about the axis line a. Further, the attitude detection part 5 detects the attitude of the engaging member 41 of the fixing part 4 with respect to the supporting part 6. Note that the fixing part 4 may be fixed to the front part 21.

In the head mount display 1F, the image display unit 3 is rotated about the axis line a by 180° with respect to the frame with the fixing part 4 attached to the front part 21, and thereby, the first state in which the image display unit 3 performs image display for the left eye EY of the observer and the second state in which the image display unit 3 performs image display for the right eye EY of the observer may be switched. Further, whether the first state or the second state may be determined based on the detection result of the attitude detection part 5.

As described above, the fixing part 4 is provided in the front part 21 of the frame 2, thus, the image display unit 3 is rotated by 180°, and thereby, the first state in which the image display unit 3 performs image display for the left eye EY of the observer and the second state in which the image display unit 3 performs image display for the right eye EY may be switched.

As above, the head mount display is explained based on the illustrated embodiments, however, the head mount display is not limited to those. For example, the respective configurations described in the embodiments may be replaced by arbitrary configurations having the same functions and other arbitrary configurations may be added thereto. Further, the configurations of the respective embodiments may be appropriately combined.

In the above described embodiments, the spectacle-shaped head mount display is explained as an example, however, the invention is not limited to that, but, for example, can be applied to a helmet-shaped or headset-shaped head mount display and a head mount display having a form supported by the body e.g. the neck, shoulder, or the like of the observer.

In the above described embodiments, the case where the whole head mount display is attached to the head of the observer is explained as an example, however, the head mount display may be divided in a part attached to the head of the observer and the part attached to or carried on another part than the head of the observer.

In the above described first to sixth embodiments, the case where the fixing part is rotatably supported with respect to the image display unit and detachable from the frame is explained as an example, however, the invention is not limited to that. For example, the fixing part is rotatably supported with respect to the frame and detachable from the image display unit.

In the above described first and fourth embodiments, the case where the magnetic sensor is provided in the image display unit and the magnet is provided in the fixing part is explained as an example, however, the invention is not limited to that. The magnetic sensor may be provided in the fixing part and the magnet may be provided in the image display unit.

In the above described second and fifth embodiments, the case where the light emitting device and the light receiving device are provided in the image display unit and the plurality of parts having different reflectances are provided in the fixing part is explained as an example, however, the invention is not limited to that. The light emitting device and the light receiving device may be provided in the fixing part and the plurality of parts having different reflectances may be provided in the image display unit.

In the above described third and sixth embodiments, the case where the distance sensor is provided in the image display unit and the plurality of parts having different heights are provided in the fixing part is explained as an example, however, the invention is not limited to that. The distance sensor may be provided in the fixing part and the plurality of parts having different heights may be provided in the image display unit.

In the above described embodiments, the case where the method by the control part performing rotation processing on the picture signal is used as the method of rotating the displayed image of the image display unit is explained as an example, however, the invention is not limited to that. For example, a method of optically rotating the picture light may be used.

The configuration of the optical scanner explained in the above described embodiments is an example, however, not limited to that. For example, the shapes of the respective parts etc. may be appropriately changed. Further, in the above described embodiments, the case where the picture light is generated by two-dimensional scanning of signal lights by one optical scanner is explained as an example, however, the picture light may be generated by two-dimensional scanning of signal lights using two optical scanners.

In the above described embodiments, the case where the picture light is generated by the image display unit using the optical scanner is explained as an example, however, the invention is not limited to that. For example, the picture light may be generated using a liquid crystal panel. In other words, the invention can be applied not only to the head mount display using the optical scanning projector but also to ahead mount display using a liquid crystal projector.

The entire disclosure of Japanese Patent Application No. 2015-213919, filed Oct. 30, 2015 is expressly incorporated by reference herein.

What is claimed is:

1. A head mount display comprising:
a frame attached to a head of an observer;
an image display unit that displays an image to be visually recognized by the observer;
a bracket that fixes the image display unit to the frame;
a sensor that detects a signal according to a relative attitude of the image display unit with respect to the frame; and
a controller that controls the image displayed by the image display unit based on the output signal of the sensor,
wherein the bracket includes an engaging member having a concave part which engages the frame and a support that rotatably supports the engaging member and provides rotational displacement of the image display unit,
wherein the sensor includes a magnet disposed on an outer surface of the bracket and a magnetic sensor disposed on a casing of the image display unit, and
wherein the magnetic sensor detects a circumferential position of the image display unit around an axis through the support based on the position of the magnetic sensor relative to the magnet.

2. The head mount display according to claim 1, wherein the bracket can be switched between a first state in which the image display unit is fixed to the frame in a first attitude and a second state in which the image display unit is fixed to the frame in a second attitude different from the first attitude, and
the controller rotates the image displayed by the image display unit in response to switching between the first state and the second state based on the output signal of the sensor.

3. The head mount display according to claim 2, wherein the bracket can be switched to a third state in which the image display unit is fixed to the frame in a third attitude different from the first attitude and the second attitude, and
the controller changes the image displayed by the image display unit in response to switching between the first state or the second state and the third state based on the output signal of the sensor.

4. The head mount display according to claim 1, wherein the bracket is rotatably supported with respect to the image display unit or the frame, and
the sensor detects a rotation state of the bracket with respect to the image display unit or the frame.

5. The head mount display according to claim 4, wherein the bracket is rotatably supported with respect to the image display unit and detachable from the frame.

6. The head mount display according to claim 4, wherein the frame has a spectacle shape including a front part and temple parts connected to the front part.

7. The head mount display according to claim 6, wherein the bracket is detachably provided in the temple part.

8. The head mount display according to claim 6, wherein the bracket is provided in the front part.

9. The head mount display according to claim 1, wherein the sensor has a plurality of parts having different reflectances provided in the bracket and a light receiving device provided in the image display unit.

10. The head mount display according to claim 1, wherein the sensor has a plurality of parts having different heights provided in the bracket and a distance sensor provided in the image display unit.

* * * * *